(12) United States Patent
Fukuda et al.

(10) Patent No.: US 12,366,879 B2
(45) Date of Patent: Jul. 22, 2025

(54) PEDAL DEVICE

(71) Applicant: DENSO CORPORATION, Kariya (JP)

(72) Inventors: Yasuhisa Fukuda, Kariya (JP); Etsugo Yanagida, Kariya (JP); Daisuke Hokuto, Kariya (JP); Masashi Arao, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/501,718

(22) Filed: Nov. 3, 2023

(65) Prior Publication Data

US 2024/0061462 A1     Feb. 22, 2024

Related U.S. Application Data

(63) Continuation of application No. PCT/JP2022/013791, filed on Mar. 24, 2022.

(30) Foreign Application Priority Data

May 14, 2021   (JP) ................................. 2021-082793

(51) Int. Cl.
  *G05G 1/30*      (2008.04)
  *B60T 7/04*      (2006.01)
  (Continued)

(52) U.S. Cl.
  CPC ................ *G05G 1/44* (2013.01); *G05G 5/03* (2013.01); *G05G 5/05* (2013.01); *B60T 7/06* (2013.01)

(58) Field of Classification Search
  CPC .. G05G 1/30; G05G 1/44; G05G 1/46; G05G 5/03; G05G 5/04; G05G 5/05;
  (Continued)

(56) References Cited

U.S. PATENT DOCUMENTS

| | | | | |
|---|---|---|---|---|
| 2,827,800 A | * | 3/1958 | Brelsford | B60K 28/06 74/513 |
| 3,430,512 A | * | 3/1969 | Felix | F16D 25/12 74/516 |

(Continued)

FOREIGN PATENT DOCUMENTS

| | | | | |
|---|---|---|---|---|
| CN | 108313037 A | * | 7/2018 | ................ B60T 7/06 |
| CN | 110027529 A | * | 7/2019 | |

(Continued)

OTHER PUBLICATIONS

Machine translation of CN 110027529 A obtained on Oct. 9, 2024.*

(Continued)

*Primary Examiner* — Adam D Rogers
(74) *Attorney, Agent, or Firm* — Nixon & Vanderhye P.C.

(57) ABSTRACT

A pedal device includes a shaft, a pedal, a housing, a reaction force generating mechanism, and a connecting rod. The connecting rod includes an arm portion and a push portion. The arm portion is connected to a back surface of the pedal. The push portion is connected to the arm portion. The push portion is configured to transmit force from the pedal to the reaction force generating mechanism by contacting the reaction force generating mechanism when the pedal is stepped on by an operator. Further, the connecting rod is connected to the back surface of the pedal, to rotate with the pedal about the axis of the shaft when the operator steps on the pedal, while an angle defined between the back surface of the pedal and an axis of the connecting rod is maintained.

22 Claims, 18 Drawing Sheets

(51) Int. Cl.
  *G05G 1/44*        (2008.04)
  *G05G 5/03*        (2008.04)
  *G05G 5/05*        (2006.01)
  *B60T 7/06*        (2006.01)

(58) Field of Classification Search
  CPC ......... G05G 2505/00; B60T 7/04; B60T 7/06; B60K 26/02; B60K 26/021
  See application file for complete search history.

(56) References Cited

U.S. PATENT DOCUMENTS

| | | | | |
|---|---|---|---|---|
| 10,488,283 | B2* | 11/2019 | Sumi | B60T 7/042 |
| 10,571,949 | B2* | 2/2020 | Isono | B60T 11/18 |
| 11,077,752 | B2* | 8/2021 | Kim | G05G 5/05 |
| 12,179,587 | B2* | 12/2024 | Kihara | G05G 25/02 |
| 12,204,360 | B2* | 1/2025 | Hokuto | B60T 7/042 |
| 2007/0193401 | A1* | 8/2007 | Campbell | G05G 1/38 74/560 |
| 2008/0245178 | A1* | 10/2008 | Fujiwara | G05G 1/38 74/512 |
| 2018/0275712 | A1 | 9/2018 | Isono | |
| 2023/0211659 | A1* | 7/2023 | Hariu | B60K 35/28 74/514 |
| 2023/0286378 | A1* | 9/2023 | Kihara | G05G 25/02 |
| 2023/0391298 | A1* | 12/2023 | Fukuda | B60T 7/06 |
| 2023/0393605 | A1* | 12/2023 | Hokuto | B60T 7/042 |
| 2023/0393606 | A1* | 12/2023 | Fukuda | G05G 1/44 |
| 2023/0393607 | A1* | 12/2023 | Yamamoto | G05G 1/44 |
| 2023/0406270 | A1* | 12/2023 | Hokuto | B60T 7/06 |
| 2024/0059143 | A1* | 2/2024 | Ito | G05G 1/44 |
| 2024/0059260 | A1* | 2/2024 | Ito | B60T 8/17 |
| 2024/0059261 | A1* | 2/2024 | Hokuto | B60T 8/17 |
| 2024/0059262 | A1* | 2/2024 | Hokuto | B60T 8/17 |
| 2024/0061461 | A1* | 2/2024 | Nishimura | B60T 8/17 |
| 2024/0069587 | A1* | 2/2024 | Fukuda | B60T 7/042 |
| 2024/0069588 | A1* | 2/2024 | Arao | B60T 7/06 |
| 2024/0201725 | A1* | 6/2024 | Arao | G05G 1/30 |
| 2024/0278752 | A1* | 8/2024 | Janson | B60T 7/042 |
| 2024/0294147 | A1* | 9/2024 | Nishimura | G05G 1/30 |
| 2024/0383453 | A1* | 11/2024 | Ito | B60T 8/17 |

FOREIGN PATENT DOCUMENTS

| | | | | |
|---|---|---|---|---|
| CN | 110027531 | A | * | 7/2019 |
| CN | 111267797 | A | * | 6/2020 |
| FR | 2380160 | A1 | * | 9/1978 |
| JP | 62-56482 | | | 4/1987 |
| WO | WO-2007003810 | A2 | * | 1/2007 ............... G05G 1/44 |

OTHER PUBLICATIONS

Machine translation of WO 2007/003810 A2 obtained on Oct. 9, 2024.*
U.S. Appl. No. 18/500,944 to Masashi Arao, filed Nov. 2, 2023 (94 pages).
U.S. Appl. No. 18/500,853 to Yasuhisa Fukuda et al., filed Nov. 2, 2023 (117 pages).
U.S. Appl. No. 18/501,607 to Daisuke Hokuto et al., filed Nov. 3, 2023 (75 pages).
U.S. Appl. No. 18/500,775 to Daisuke Hokuto, filed Nov. 2, 2023 (73 pages).
U.S. Appl. No. 18/500,599 to Kengo Ito et al., filed Nov. 2, 2023 (49 pages).
U.S. Appl. No. 18/500,573 to Kengo Ito et al., filed Nov. 2, 2023 (51 pages).
U.S. Appl. No. 18/500,962 to Atsushi Nishimura et al., filed Nov. 2, 2023 (43 pages).
U.S. Appl. No. 18/500,944, filed Nov. 2, 2023, Pedal Device.
U.S. Appl. No. 18/500,853, filed Nov. 2, 2023, Pedal Device.
U.S. Appl. No. 18/501,607, filed Nov. 3, 2023, Pedal Device.
U.S. Appl. No. 18/500,775, filed Nov. 2, 2023, Pedal Device.
U.S. Appl. No. 18/501,718, filed Nov. 3, 2023, Pedal Device.
U.S. Appl. No. 18/500,599, filed Nov. 2, 2023, Vehicle Pedal Module.
U.S. Appl. No. 18/500,573, filed Nov. 2, 2023, Brake Pedal Device.
U.S. Appl. No. 18/500,962, filed Nov. 2, 2023, Pedal Device.

* cited by examiner

PEDAL DEVICE

CROSS REFERENCE TO RELATED APPLICATION

The present application is a continuation application of International Patent Application No. PCT/JP2022/013791 filed on Mar. 24, 2022, which designated the U.S. and claims the benefit of priority from Japanese Patent Application No. 2021-082793 filed on May 14, 2021. The entire disclosures of all of the above applications are incorporated herein by reference.

TECHNICAL FIELD

The present disclosure relates to a pedal device.

BACKGROUND

A pedal device including a brake pedal, an operation rod, and a stroke simulator is known. In this pedal device, the brake pedal is rotatably connected to the operation rod by inserting a pin into a hole of the brake pedal and a hole of an output portion connected to the operation rod. Also, the operation rod is rotatably connected to a rod protruding from a cylinder of the stroke simulator. In such manner, the operation rod transmits a stepping force from the brake pedal to the stroke simulator, and transmits a reaction force generated by the stroke simulator against the stepping force back to the brake pedal.

SUMMARY

According to an aspect of the present disclosure, a pedal device includes: a rod-shaped shaft; a pedal configured to rotate together with the shaft about an axis of the shaft when being stepped on by an operator; a support configured to rotatably support the shaft; a reaction force generating mechanism configured to generate a reaction force with respect to a stepping force of the operator, by an elastic deformation against to the stepping force of the operator applied to the pedal when the pedal receives force from the operator; and a connecting rod including (i) an arm portion connected to a back surface of the pedal, which is a surface of the pedal opposite to a stepping surface stepped on by the operator and (ii) a push portion connected to the arm portion. The push portion is configured to transmit force from the pedal to the reaction force generating mechanism by contacting the reaction force generating mechanism when the pedal is stepped on by the operator. Furthermore, the connecting rod is connected to the back surface of the pedal, to rotate with the pedal about the axis of the shaft when the operator steps on the pedal, while an angle defined between the back surface of the pedal and an axis of the connecting rod is maintained.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
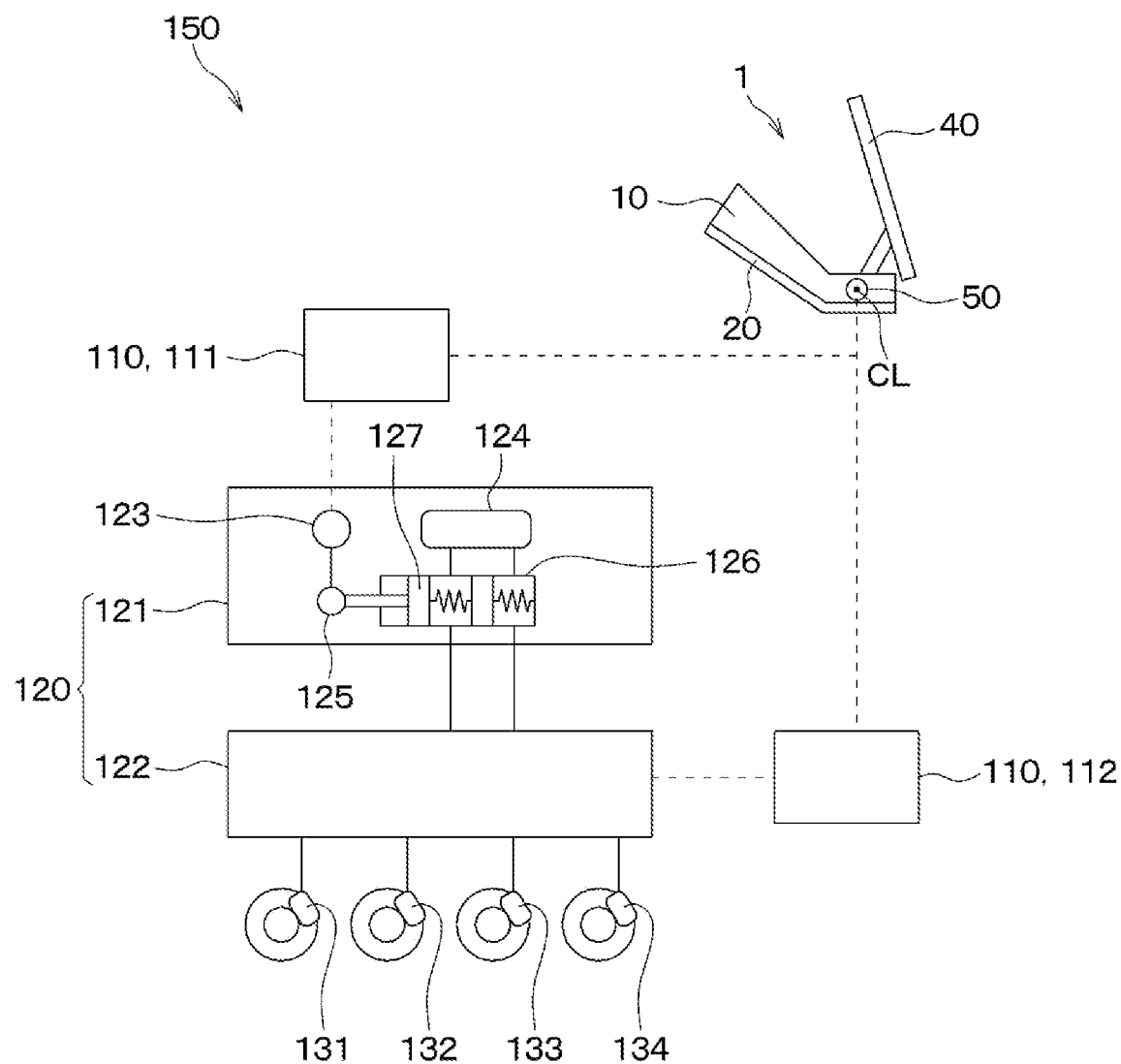
FIG. 1 is a configuration diagram of a brake-by-wire system using a pedal device of a first embodiment.

According to studies by the inventors, in a pedal device including a brake pedal, an operation rod and a stroke simulator, when the brake pedal rotates, the brake pedal and a pin may slide. Such a sliding causes rattling between the brake pedal and the pin. Further, the operation rod and a rod protruding from a cylinder of the stroke simulator may slide. In this situation, rattling may occur between the operation rod and the protruding rod. These rattles may change an angle of the brake pedal.

It is an object of the present disclosure to provide a pedal device that suppresses rattling that occurs in a pedal.

According to an aspect of the present disclosure, a pedal device includes: a rod-shaped shaft; a pedal configured to rotate together with the shaft about an axis of the shaft when being stepped on by an operator; a support configured to rotatably support the shaft; a reaction force generating mechanism configured to generate a reaction force with respect to a stepping force of the operator, by an elastic deformation against to the stepping force of the operator applied to the pedal when the pedal receives force from the operator; and a connecting rod including (i) an arm portion connected to a back surface of the pedal, which is a surface of the pedal opposite to a stepping surface stepped on by the operator and (ii) a push portion connected to the arm portion. The push portion is configured to transmit force from the pedal to the reaction force generating mechanism by contacting the reaction force generating mechanism when the pedal is stepped on by the operator. Furthermore, the connecting rod is connected to the back surface of the pedal, to rotate with the pedal about the axis of the shaft when the operator steps on the pedal, while an angle defined between the back surface of the pedal and an axis of the connecting rod is maintained.

In such manner, the back surface of the pedal and the connecting rod do not slide when the pedal rotates, thereby suppressing rattling between the pedal and the connecting rod. Therefore, rattling that occurs in the pedal can be suppressed.

Hereinafter, embodiments will be described with reference to the drawings. In the following embodiments, the same or equivalent portions are denoted by the same reference numerals, and the description thereof will be omitted.

First Embodiment

A pedal device 1 of the present embodiment is used, for example, as a brake pedal in a brake-by-wire system 150 that controls the brakes of a vehicle. First, the brake-by-wire system 150 will be described.

The brake-by-wire system 150 includes wheel cylinders 131 to 134, an ECU 110, a brake circuit 120 and a pedal device 1, as shown in FIG. 1.

The wheel cylinders 131 to 134 are arranged for each wheel of the vehicle. A brake pad (not shown) is attached to each of the wheel cylinders 131 to 134.

The ECU 110 has a first ECU 111 and a second ECU 112. The first ECU 111 has a microcomputer, a drive circuit, and the like (not shown). The first ECU 111 controls a first brake circuit 121 of the brake circuit 120, which will be described later, based on a signal from the pedal device 1, which will be described later. The second ECU 112 has a microcomputer, a drive circuit, and the like (not shown). Further, the second ECU 112 controls a second brake circuit 122 of the brake circuit 120 described later based on a signal from the pedal device 1 described later.

The brake circuit 120 includes the first brake circuit 121 and the second brake circuit 122. The first brake circuit 121 includes a reservoir 124, a motor 123, a gear mechanism 125 and a master cylinder 126. The reservoir 124 stores brake fluid. The motor 123 drives the gear mechanism 125. The gear mechanism 125 reciprocates a master piston 127 of the master cylinder 126 in an axial direction of the master cylinder 126. The second brake circuit 122 includes an electromagnetic valve (not shown) and the like. Further, the second brake circuit 122 controls the hydraulic pressure of each of the wheel cylinders 131 to 134 by opening and closing electromagnetic valves according to control signals from the second ECU 112.

Here, in order to describe the pedal device 1 below, the front-rear direction of the vehicle is defined as a vehicle front-rear direction Da. The vertical direction of the vehicle is defined as a vehicle vertical direction Db. The left-right direction of the vehicle is defined as a vehicle left-right direction Dc. The front in the vehicle front-rear direction Da is referred to as a vehicle front. The rear in the vehicle front-rear direction Da is referred to as a vehicle rear. The upper side in the vehicle vertical direction Db is referred to as a vehicle upper side. The lower side in the vehicle vertical direction Db is referred to as a vehicle lower side. The left side in the vehicle left-right direction Dc is referred to as a vehicle left side. The right side in the vehicle left-right direction Dc is referred to as a vehicle right side.

The pedal device 1 is an organ-type pedal device 1. Therefore, in the pedal device 1, a portion of the pedal 40 that is in front of the vehicle relative to a rotation axis CL rotates toward a floor 2 or toward a dash panel in a vehicle interior in response to an increase in a stepping force of a driver applied to the pedal 40, which will be described later. The dash panel is a partition wall that separates the vehicle interior from the vehicle exterior such as an engine room of the vehicle, and is sometimes called a bulkhead.

Specifically, the pedal device 1 includes a housing 5, a housing bolt 22, a reaction force generating mechanism 30, a pedal 40, a pad 402, a shaft 41 and a rotating plate 43, as shown in FIGS. 2 to 6. Further, the pedal device 1 also includes a sensor unit 50, a connecting rod 60, a rod connecting screw 65, a first stopper 70, a second stopper 75 and a cover member 77. Note that, in FIG. 6, the cover member 77 is omitted.

The housing 5 includes a first housing 10 and a second housing 20.

The first housing 10 is made of resin in a box shape. The first housing 10 includes a top wall 11, a left side wall 12, a right side wall 13, a front wall 14, a housing space 15, a housing opening 16 and a bearing hole 17.

Figure 2:
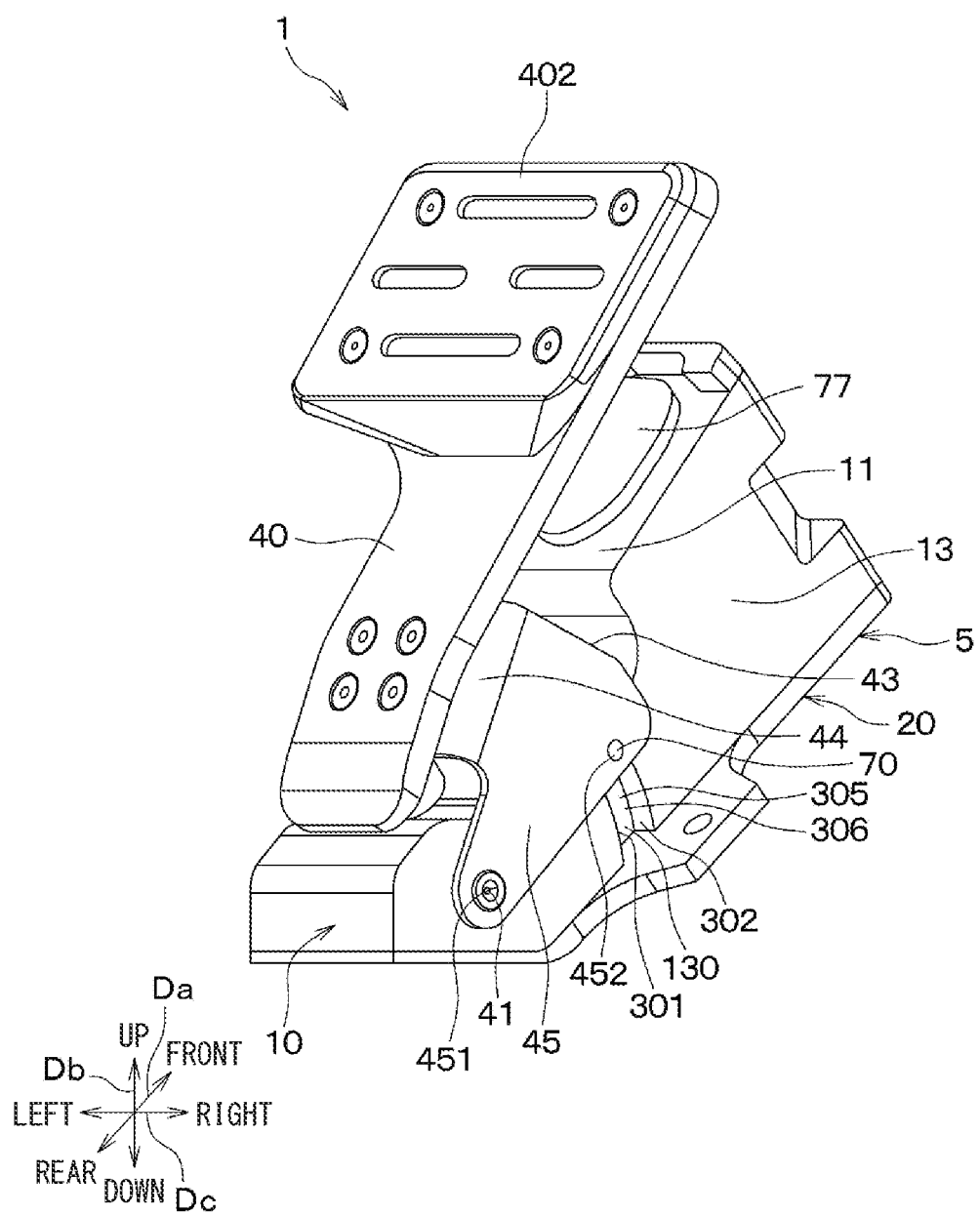
FIG. 2 is a perspective view of the pedal device.
Figure 3:
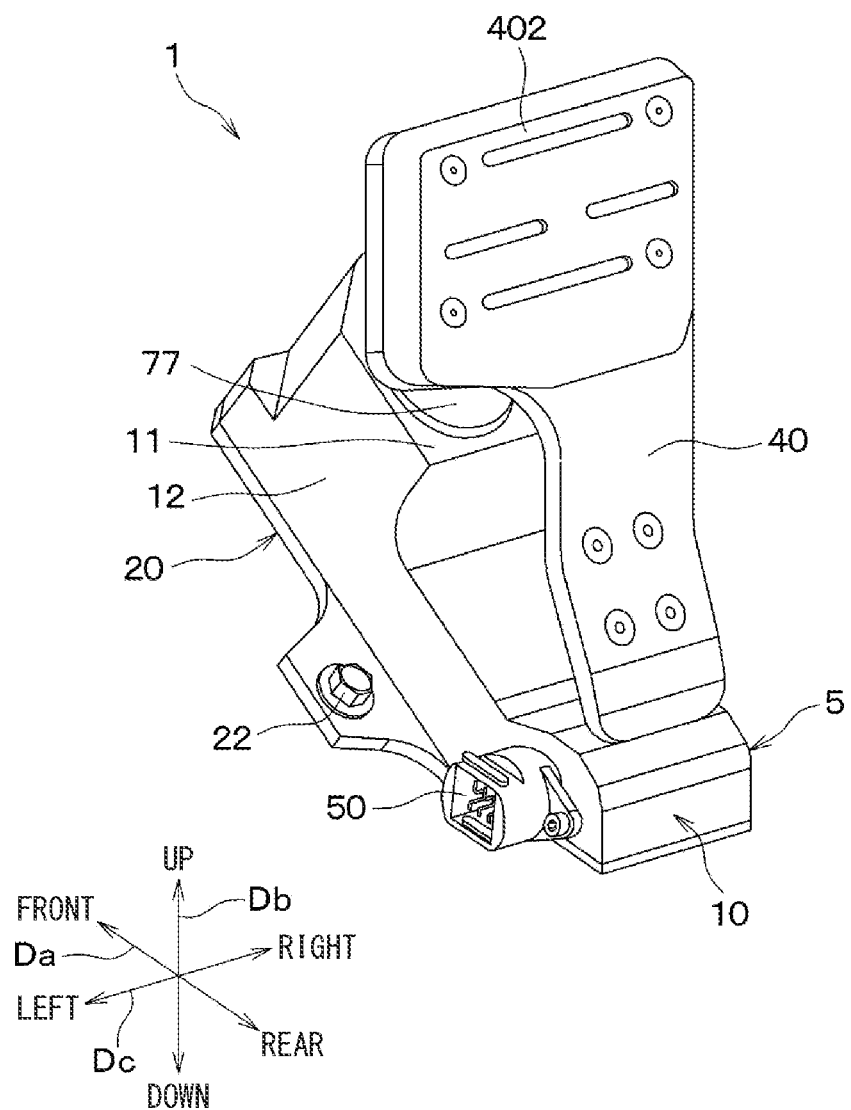
FIG. 3 is another perspective view of the pedal device.
Figure 4:
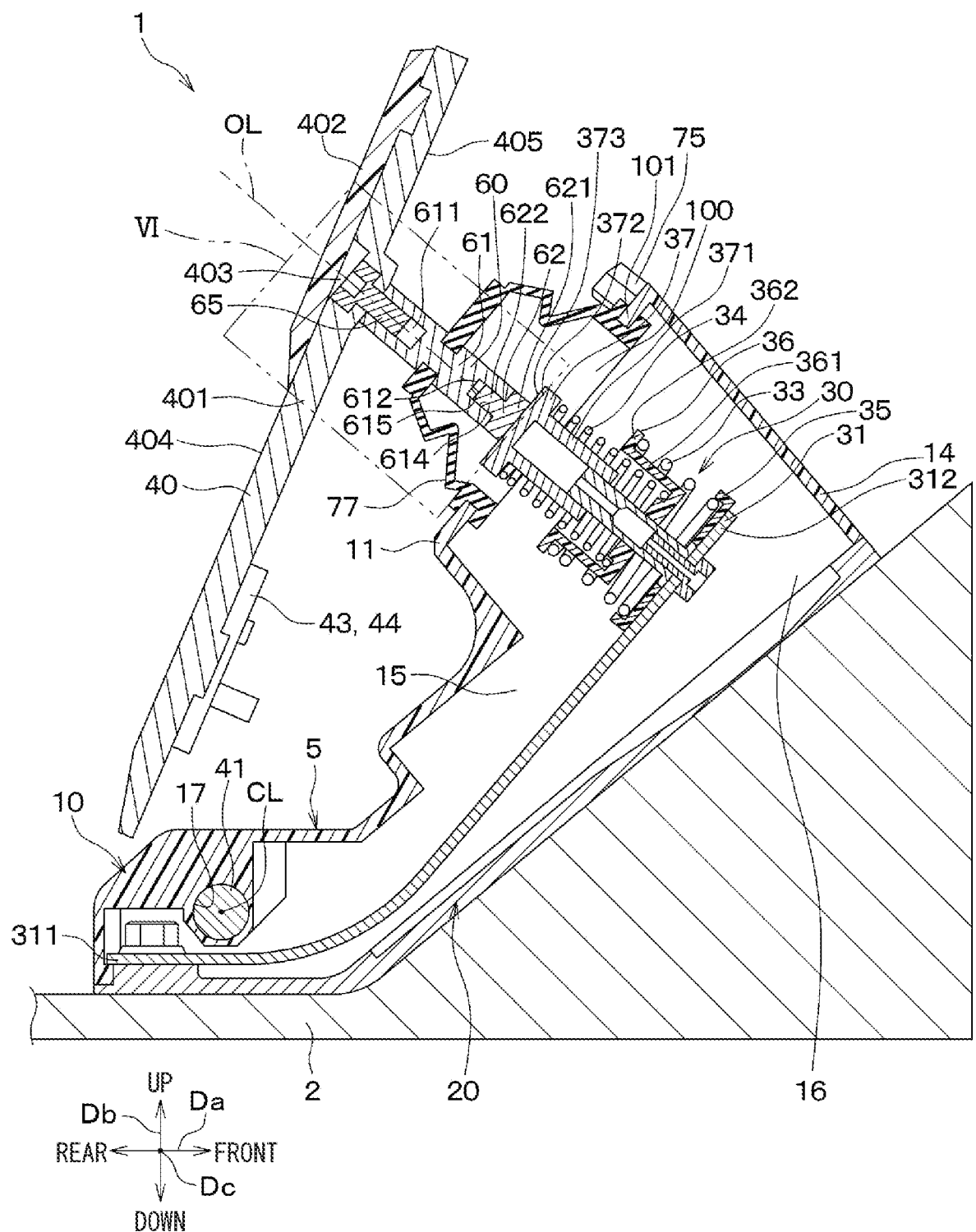
FIG. 4 is a cross-sectional view of the pedal device.

The top wall 11 is a wall of the first housing 10 on the upper side of the vehicle, as shown in FIGS. 2 to 4. Further, the top wall 11 includes a housing hole 100 and a housing end 101, as shown in FIG. 4. Most part of the reaction force generating mechanism 30 described later is inserted into the housing hole 100. The housing end 101 defines the housing hole 100. The left side wall 12 is a wall of the first housing 10 on the left side of the vehicle, as shown in FIG. 3.

Figure 5:
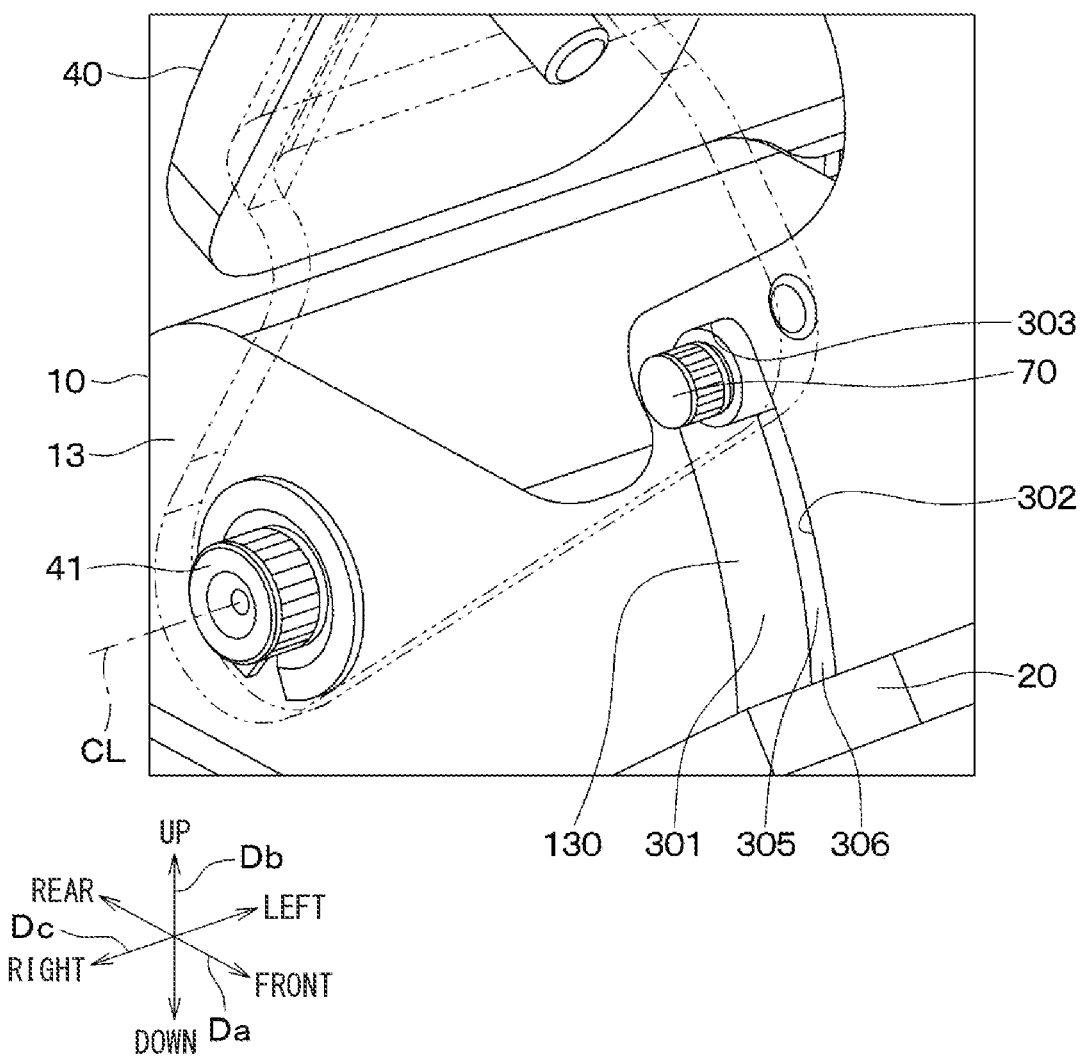
FIG. 5 is a perspective view of a portion of the pedal device.

The right side wall 13 is, as shown in FIGS. 2 and 5, a wall of the first housing 10 on the right side of the vehicle. The right side wall 13 also includes a housing recess 130.

The housing recess 130 is recessed from an outer surface of the right side wall 13 in the left direction of the vehicle. Further, the housing recess 130 includes a housing recess bottom surface 305, a housing recess first side surface 301, a housing recess second side surface 302, a housing recess third side surface 303 and a housing recess space 306.

The housing recess bottom surface 305 is a surface facing the right side of the vehicle. Further, the housing recess bottom surface 305 is formed in an arc shape centered on the rotation axis CL of the pedal 40, which will be described later.

The housing recess first side surface 301 is connected to a vehicle rear side of the housing recess bottom surface 305. Further, the housing recess first side surface 301 is formed in a shape of a side surface of an arc column centered on the rotation axis CL of the pedal 40, which will be described later.

The housing recess second side surface 302 is connected to a vehicle front side of the housing recess bottom surface 305. Further, the housing recess second side surface 302 is formed in a shape of a side surface of an arc column centered on the rotation axis CL of the pedal 40, which will be described later.

The housing recess third side surface 303 is connected to a vehicle upper side of the following three surfaces, i.e., the housing recess bottom surface 305, the housing recess first side surface 301, and the housing recess second side surface 302.

The housing recess space 306 is a space formed by the housing recess bottom surface 305, the housing recess first side surface 301, the housing recess second side surface 302 and the housing recess third side surface 303. Further, the housing recess space 306 is formed in an arc shape centered on the rotation axis CL of the pedal 40 described later, due to the shapes of the housing recess bottom surface 305, the housing recess first side surface 301, and the housing recess second side surface 302.

The front wall 14 is a wall of the first housing 10 on the front side of the vehicle, as shown in FIG. 4. The housing space 15 is a space defined by the top wall 11, the left side wall 12, the right side wall 13 and the front wall 14. The housing opening 16 is an open space defined by an end of the top wall 11, an end of the left side wall 12, an end of the right side wall 13 and an end of the front wall 14 in the housing space 15. The bearing hole 17 is a cylindrical space extending in the vehicle left-right direction Dc.

The second housing 20 is formed in a plate shape, and is connected to the respective ends of the top wall 11, the left side wall 12, the right side wall 13 and the front wall 14 of the first housing 10. Also, for example, a hole (not shown) at the end of the top wall 11 of the first housing 10, a hole (not shown) at the end of the left side wall 12, a hole (not shown) at the end of the right side wall 13, a hole (not shown) at the end of the front wall 14, and holes on the second housing 20 corresponding thereto each have a bolt (not shown) inserted thereinto. Thereby, the second housing 20 is fixed to the first housing 10 and closes the housing opening 16. Also, the second housing 20 is made of metal. Furthermore, as described above, the first housing 10 is made of resin. Therefore, the Young's modulus of the second housing 20 is higher than that of the first housing 10. Thus, the rigidity of the housing 5 is higher than when both the first housing 10 and the second housing 20 are made of resin. Furthermore, as shown in FIG. 3, housing bolts 22 are inserted into (i) the holes of the second housing 20 and (ii) the holes of the floor 2 corresponding to the holes of the second housing 20, thereby fixing the second housing 20 and the floor 2. In such manner, the pedal device 1 is fixed to the floor 2.

The reaction force generating mechanism 30 generates a reaction force against the driver's stepping force applied to the pedal 40. For example, the reaction force generating mechanism 30 includes a leaf spring 31, a lower holder 35, a large-diameter coil spring 33, a small-diameter coil spring 34, a spring seat 36 and an upper holder 37, as shown in FIG. 4.

The leaf spring 31 is curved so as to form a convex curved surface toward the floor 2 when not receiving a load. Further, one end 311 of the leaf spring 31 is connected to a vehicle rear side of the second housing 20. The lower holder 35 is connected to an other end 312 of the leaf spring 31. The large-diameter coil spring 33 is connected to one side of the lower holder 35 opposite to the leaf spring 31. The spring seat 36 includes a spring seat small-diameter portion 361 and a spring seat large-diameter portion 362. The spring seat small-diameter portion 361 is formed in a cylindrical shape with a bottom. Further, the spring seat small-diameter portion 361 is arranged in a space inside the large-diameter coil spring 33. The spring seat large-diameter portion 362 is connected to one side of the spring seat small-diameter portion 361 opposite to the bottom. Also, a diameter of the spring seat large-diameter portion 362 is larger than a diameter of the spring seat small-diameter portion 361. Thereby, the spring seat large-diameter portion 362 and the large-diameter coil spring 33 are connected. Further, a small-diameter coil spring 34 is accommodated in the spring seat small-diameter portion 361, and is connected to the bottom of the spring seat small-diameter portion 361.

The upper holder 37 has a holder small-diameter portion 371 and a holder large-diameter portion 372. The holder small-diameter portion 371 is formed in a tubular shape. Further, the holder small-diameter portion 371 is arranged in a space inside the small-diameter coil spring 34. Further, a pin is inserted into each of a hole of the leaf spring 31, a hole of the lower holder 35, a hole of the spring seat small-diameter portion 361, and a hole of the holder small-diameter portion 371, so that the leaf spring 31, the lower holder 35, the spring seat 36 and the upper holders 37 are connected to each other. In addition, the pin slides on an inner surface of the small-diameter portion 371 of the holder and also on an inner surface of the spring seat small-diameter portion 361. The holder large-diameter portion 372 is connected to the holder small-diameter portion 371 on one side opposite to the spring seat 36. Further, a diameter of the holder large-diameter portion 372 is larger than a diameter of the holder small-diameter portion 371. Thereby, the holder large-diameter portion 372 and the small-diameter coil spring 34 are connected. Further, the holder large-diameter portion 372 includes a mechanism-side contact surface 373 that is in contact with the connecting rod 60, which will be described later. The mechanism-side contact surface 373 is a surface of the holder large-diameter portion 372 opposite to the holder small-diameter portion 371, and is flat.

The pedal 40 is formed in a plate shape. The pedal 40 includes a pedal plate portion 401 and a rod fixing hole 403.

Figure 6:
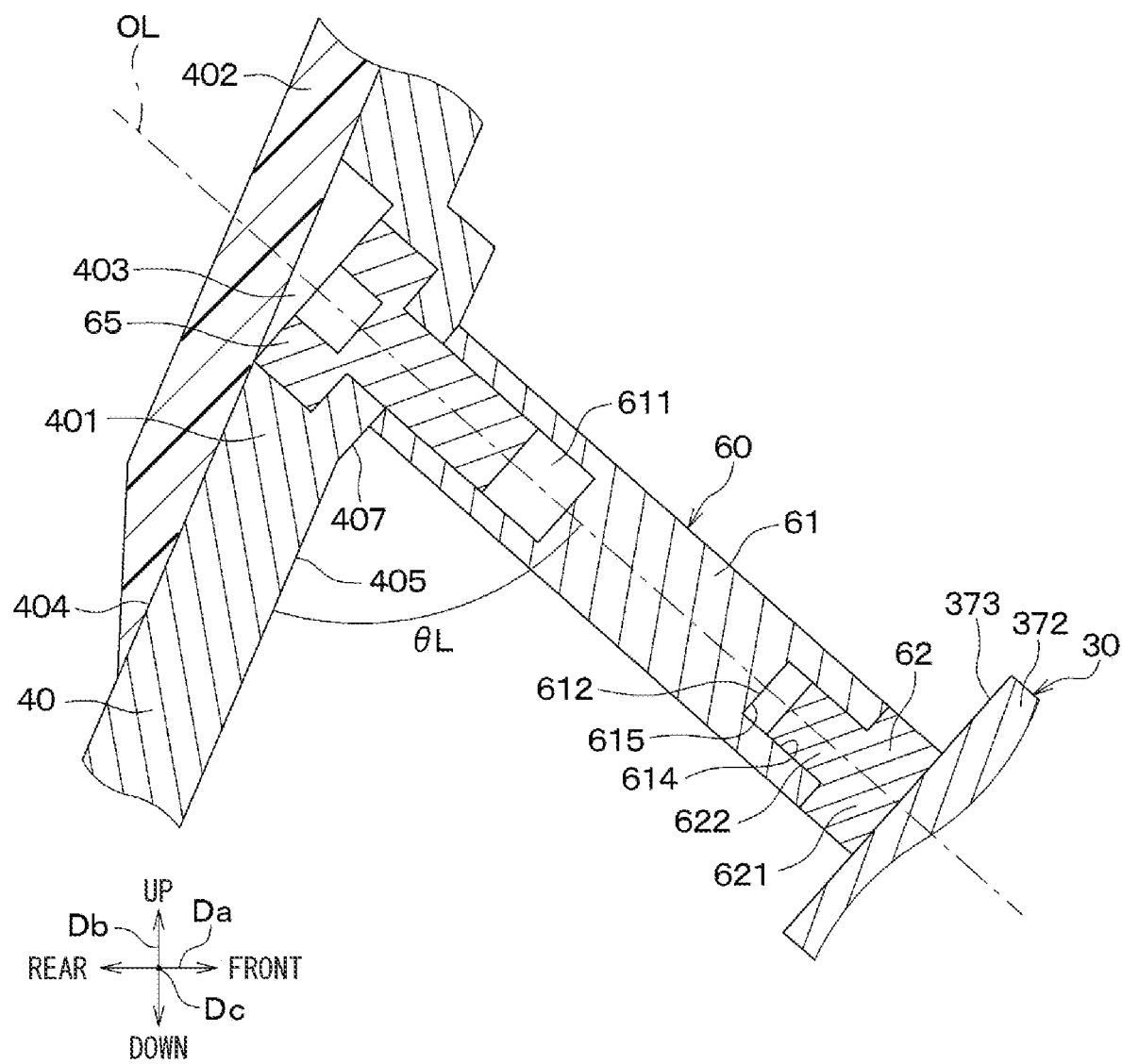
FIG. 6 is an enlarged view of a VI portion in FIG. 4.

The pedal plate portion 401 is made of metal. The pedal plate portion 401 includes a pedal surface 404 and a pedal back surface 405. The pedal surface 404 is one side facing the driver of the vehicle. The pedal back surface 405 is a surface of the pedal plate portion 401 opposite to the pedal surface 404. Further, the pedal back surface 405 includes a slope 407, as shown in FIG. 6. The slope 407 is inclined with respect to the direction in which the pedal back surface 405 extends.

The rod fixing hole 403 is a hole penetrating through the pedal surface 404 and the slope 407 of the pedal back surface 405.

The pad 402 is made of rubber or the like. Further, the pad 402 is connected to the vehicle upper side of the pedal surface 404. Additionally, the pad 402 is stepped on by the driver of the vehicle. Further, the pad 402 covers a pedal surface 404 side of the rod fixing hole 403. In such manner, the rod fixing hole 403 is not visible to the driver of the vehicle.

The shaft 41 is made of metal, and has a cylindrical shape. Further, the shaft 41 is inserted into the bearing hole 17 of the first housing 10, and is rotatably supported by the first housing 10.

The rotating plate 43 is formed in an L shape. Further, as shown in FIGS. 2 and 4, the rotating plate 43 includes a back plate portion 44 and a side plate portion 45. As shown in FIG. 4, the back plate portion 44 is fixed to the pedal back surface 405 by inserting screws into a hole of the back plate portion 44 and into a corresponding hole of the pedal plate portion 401. The side plate portion 45 is vertically connected to a vehicle right side of the back plate portion 44. Further, the side plate portion 45 also includes a shaft hole 451 and a stopper hole 452, as shown in FIG. 2.

The shaft 41 is inserted into the shaft hole 451. The pedal 40 are thus connected to the shaft 41 via the rotating plate 43. Thereby, the pedal 40 rotates together with the shaft 41 and the rotating plate 43, about the rotation axis CL, which is an axis of the shaft 41.

The stopper hole 452 is formed on a vehicle front side of the shaft hole 451. Further, the stopper hole 452 communicates with the housing recess space 306. Further, a part of the first stopper 70 described later is inserted into the stopper hole 452.

As shown in FIG. 3, the sensor unit 50 is arranged on one side of the shaft 41 opposite to the side plate portion 45, that is, on the left side of the vehicle. Further, the sensor unit 50 includes a magnet, a yoke, a Hall element, and the like. (not shown). The sensor unit 50 detects a rotation angle of the pedal 40 by detecting a rotation angle of the shaft 41 using the magnet, the yoke, the Hall element, and the like. Further, the sensor unit 50 outputs a signal corresponding to the detected rotation angle of the pedal 40 to the first ECU 111 and the second ECU 112. Note that the sensor unit 50 may include an MR element instead of the Hall element. MR is an abbreviation of Magneto Resistive. Further, the sensor unit 50 may be an inductive sensor that detects a rotation angle using a coil.

The connecting rod 60 is made of metal, and has a rod shape. As shown in FIGS. 4 and 6, the connecting rod 60 includes an arm portion 61 and a push portion 62. Here, the arm portion 61 and the push portion 62 are formed to have separate bodies.

The arm portion 61 includes an arm hole 611 and an arm recess 612. The arm hole 611 is a hole corresponding to the rod fixing hole 403. The arm portion 61 is fixed to the slope 407 of the pedal back surface 405 by inserting the rod connecting screw 65 into the arm hole 611 and the rod fixing hole 403.

The arm recess 612 is recessed in the axial direction of the connecting rod 60 from an end surface of the arm portion 61 on a push portion 62 side (to be described later). The arm recess 612 includes an arm recess side surface 614 and an arm recess bottom surface 615. The arm recess side surface 614 is connected to an end surface of the arm portion 61 on a push portion 62 side, which will be described later. The arm recess bottom surface 615 is connected to the arm recess side surface 614. Further, a space is formed by the arm recess side surface 614 and the arm recess bottom surface 615.

The push portion 62 extends parallel to the arm portion 61, as shown in FIGS. 4 and 6. Also, the push portion 62 includes a push contactor 621 and a push convex portion 622. The push contactor 621 is in contact with the mechanism-side contact surface 373 of the upper holder 37 in the reaction force generating mechanism 30. The push convex portion 622 protrudes in the axial direction of the connecting rod 60 from one side of the push contactor 621 opposite to the mechanism-side contact surface 373. Also, the push convex portion 622 is inserted into a space formed by the arm recess side surface 614 and the arm recess bottom surface 615. Thereby, the arm portion 61 and the push portion 62 are connected.

As shown in FIGS. 2 and 5, the first stopper 70 is shaped like a rod extending in the vehicle left-right direction Dc. A part of the first stopper 70 is inserted into the stopper hole 452 of the rotating plate 43. In such manner, the first stopper 70 rotates together with the rotating plate 43, the pedal 40 and the shaft 41 about the rotation axis CL, which is the axis of the shaft 41. Further, a part of the first stopper 70 is inserted into the housing recess space 306. The second stopper 75 protrudes from a vehicle upper side portion of the top wall 11 of the first housing 10 toward the pedal 40. Further, the cover member 77 is a component called as a dust boot, and is made of elastically deformable rubber or the like, and is formed in a tubular and bellows shape. The cover member 77 expands and contracts in the axial direction of the connecting rod 60 as the pedal 40 swings. For example, the cover member 77 closes the housing hole 100 with the connecting rod 60 inserted therein. This prevents foreign matter from entering the housing space 15 through the housing hole 100.

The brake-by-wire system 150 is configured as described above. Next, operation of the pedal device 1 will be described.

When the driver of the vehicle does not step on the pad 402 of the pedal 40, the large-diameter coil spring 33 and the small-diameter coil spring 34 of the reaction force generating mechanism 30 are compressed. At this time, restoring forces of the large-diameter coil spring 33 and the small-diameter coil spring 34 are transmitted to the pedal 40 via the connecting rod 60 connected to the upper holder 37 of the reaction force generating mechanism 30. The restoring force causes the pedal 40 to rotate in a direction away from the first housing 10. Also, at this time, the first stopper 70 connected to the pedal 40 via the rotating plate 43 contacts the housing recess third side surface 303 of the right side wall 13 of the first housing 10. In such manner, a position of the pedal 40 when the driver of the vehicle is not stepping on the pad 402 of the pedal 40 is fixed.

When the driver of the vehicle steps on the pad 402 of the pedal 40, the pedal 40 rotates together with the shaft 41 and the rotating plate 43 about the rotation axis CL, which is the axis of the shaft 41. Such a rotation causes the pedal 40 to rotate in a direction toward the first housing 10.

At this time, the sensor unit 50 detects the rotation angle of the pedal 40 by detecting the rotation angle of the shaft 41. Further, the sensor unit 50 outputs a signal corresponding to the detected rotation angle of the pedal 40 to the first ECU 111 and the second ECU 112.

At this time, the first ECU 111 rotates the motor 123 by supplying electric power to the motor 123, for example. In such manner, the gear mechanism 125 is driven and the master piston 127 is moved. Therefore, the hydraulic pressure of the brake fluid supplied from the reservoir 124 to the master cylinder 126 increases. The increased hydraulic pressure is supplied to the second brake circuit 122.

Also, the second ECU 112 supplies electric power to an electromagnetic valve (not shown) of the second brake circuit 122, for example. In such manner, a solenoid valve of the second brake circuit 122 opens. Therefore, the brake fluid supplied to the second brake circuit 122 is supplied to each of the wheel cylinders 131 to 134. Therefore, the brake pads attached to the wheel cylinders 131 to 134 rub against their corresponding brake discs. Therefore, each wheel is braked and the vehicle is decelerated. At this time, the second ECU 112 may perform ABS control, VSC control, collision avoidance control, regenerative cooperative control, and the like, based on signals from the sensor unit 50 and signals from other electronic control devices (not shown). ABS is an abbreviation of Anti-lock Braking System. VSC is an abbreviation of Vehicle Stability Control.

Further, at this time, the connecting rod 60 connected to the slope 407 of the pedal back surface 405 rotates with the pedal 40 about the rotation axis CL while maintaining the angle θL between the pedal back surface 405 and the axis OL of the connecting rod 60, as shown in FIG. 6. At this time, the connecting rod 60 passes through the housing hole 100. Further, force from the pedal 40 is transmitted to the upper holder 37 by the push portion 62 of the connecting rod 60 coming into contact with the upper holder 37 of the reaction force generating mechanism 30. In such manner, an inner surface of the holder small-diameter portion 371 of the upper holder 37 and the pin slide, and the small-diameter coil spring 34 is compressed by the upper holder 37. Further, force from the pedal 40 is transmitted to the spring seat 36 via the small-diameter coil spring 34. Also, the contact of the upper holder 37 with the spring seat 36 causes force from the pedal 40 to be transmitted to the spring seat 36 via the upper holder 37. Therefore, an inner surface of the spring seat small-diameter portion 361 of the spring seat 36 and the pin slide, and the large-diameter coil spring 33 is compressed by the spring seat 36. Further, force from the pedal 40 is transmitted to the leaf spring 31 via the large-diameter coil spring 33. Therefore, the leaf spring 31 bends. Further, when an inner surface of the holder small-diameter portion 371 of the upper holder 37 and the pin slide and the holder large-diameter portion 372 of the upper holder 37 comes into contact with the pin, force from the pedal 40 is transmitted to the leaf spring 31 via the pin. In such manner, the leaf spring 31 bends. At this time, the reaction force generating mechanism 30 generates a reaction force against the driver's stepping force applied to the pedal 40 by the restoring force of the plate spring 31, the large-diameter coil spring 33 and the small-diameter coil spring 34. Therefore, even if the pedal 40 and the master cylinder 126 are not mechanically connected to each other, the pedal device 1 produces the same reaction force as when the pedal 40 are connected to the master cylinder 126, i.e., when the hydraulic reaction force is obtainable.

Further, when the driver of the vehicle stops stepping on the pad 402 of the pedal 40, the reaction force of the reaction force generating mechanism 30 causes the pedal 40 to rotate away from the first housing 10. At this time, the first stopper 70 rotates together with the pedal 40. In such manner, the first stopper 70 contacts the housing recess third side surface 303 of the right side wall 13 of the first housing 10 after moving within the housing recess space 306. Therefore, the pedal 40 stops rotating. In such manner, the position of the pedal 40 returns to an initial position, i.e., to a position when the driver of the vehicle does not step on the pad 402 of the pedal 40.

Thus, the pedal device 1 operates in the above-described manner. Next, how the pedal device 1 suppresses rattling of the pedal 40 will be described.

The pedal device 1 includes the shaft 41, the pedal 40, the housing 5, the reaction force generating mechanism 30 and the connecting rod 60. The shaft 41 is formed in a rod shape. The pedal 40 rotates about the rotation axis CL together with the shaft 41 when the driver of the vehicle steps on the pedal 40. The reaction force generating mechanism 30 is elastically deformed by receiving force from the pedal 40 when the pedal 40 is stepped on by the vehicle driver, thereby generating a reaction force against the stepping force applied to the pedal 40 by the vehicle driver. The connecting rod 60 has the arm portion 61 and the push portion 62. The arm portion 61 is connected to the pedal back surface 405. The pedal back surface 405 is a surface of the pedal 40 opposite to a surface that is stepped on by the driver of the vehicle. The push portion 62 is connected to the arm portion 61. Further, the push portion 62 contacts the reaction force generating mechanism 30 when the pedal 40 is stepped on by the driver of the vehicle, thereby transmitting the force from the pedal 40 to the reaction force generating mechanism 30. Further, as shown in FIG. 6, when the pedal 40 is stepped on by the driver of the vehicle, the connecting rod 60 rotates about the rotation axis CL while maintaining the angle θL between the pedal back surface 405 and the axis OL of the connecting rod 60, together with the pedal 40. Note that the rotation axis CL corresponds to an axis of the shaft 41. The driver of the vehicle corresponds to an operator. The housing 5 corresponds to a support.

In such manner, the back surface 405 of the pedal and the connecting rod 60 do not slide when the pedal 40 rotates, thereby suppressing the rattling between the pedal 40 and the connecting rod 60. Further, since the occurrence of rattling is suppressed, the change in the angle of the pedal 40 due to rattling is suppressed. Therefore, since the accuracy of the rotation angle of the pedal 40 is improved, the accuracy of an output value from the sensor unit 50 is improved. This facilitates appropriate control of the first brake circuit 121 by the first ECU 111 and facilitates appropriate control of the second brake circuit 122 by the second ECU 112. Therefore, the vehicle is more likely to be properly braked, thereby improving the safety of the vehicle.

In addition, the pedal device 1 also exerts the following effects.

[1-1] The push portion 62 is in contact with the reaction force generating mechanism 30 when the pedal 40 is not stepped on by the driver of the vehicle.

In such manner, the push portion 62 is supported by the reaction force generating mechanism 30 when the pedal 40 is not stepped on by the driver of the vehicle. Therefore, when the pedal 40 is not stepped on by the driver of the vehicle, the connecting rod 60 and the pedal 40 do not rotate, so the shaft 41 connected to the pedal 40 via the rotating plate 43 does not rotate. Therefore, when the pedal 40 is not stepped on by the driver of the vehicle, the shaft 41 and the first housing 10 do not slide, thereby rattling between the shaft 41 and the first housing 10 is suppressible.

[1-2] The pedal back surface 405 includes the slope 407. The slope 407 is inclined with respect to the direction in which the pedal back surface 405 extends. Also, the arm portion 61 is connected to the slope 407.

In such manner, the angle θL formed between the pedal back surface 405 and the axis OL of the connecting rod 60 is changed compared to when the arm portion 61 is connected to the pedal back surface 405 other than the slope 407. Therefore, a contact state between the push portion 62 of the connecting rod 60 and the reaction force generating mechanism 30 is changed. Therefore, by adjusting an inclination angle of the slope 407, the contact state between the push portion 62 and the reaction force generating mechanism 30 is adjustable.

[1-3] The arm portion 61 is separated from the push portion 62. Thereby, a material of the arm portion 61 may be changed to a material different from a material of the push portion 62.

[1-4] The side surface of the arm portion 61 is parallel to the side surface of the push portion 62. In such manner, a direction of the arm portion 61 and a direction of the push portion 62 become the same, thereby the angle θL formed between the pedal back surface 405 and the axis OL of the connecting rod 60 becomes constant. Therefore, the contact state between the push portion 62 and the reaction force generating mechanism 30 is easily adjustable.

[1-5] The arm portion 61 has the arm recess 612. The arm recess 612 is recessed in the axial direction of the connecting rod 60 from the end surface of the arm portion 61 on the push portion 62 side. The arm recess 612 also includes the arm recess bottom surface 615 and the arm recess side surface 614 connected to the arm recess bottom surface 615. The push portion 62 has the push convex portion 622. The push convex portion 622 protrudes in the axial direction of the connecting rod 60 from the end surface of the push portion 62 on the arm portion 61 side. The push portion 62 and the arm portion 61 are connected by an insertion of the push convex portion 622 into the space formed by the arm recess bottom surface 615 and the arm recess side surface 614.

Since the push portion 62 and the arm portion 61 are thereby fixed, the push portion 62 and the arm portion 61 are less likely to come off.

[1-6] The arm portion 61 contains metal. Since metal is a material that is relatively difficult to deform, the arm portion 61 is less likely to deform. Such configuration provides a structure in which the angle θL between the pedal back surface 405 and the axis OL of the connecting rod 60 is easily keepable.

[1-7] The push portion 62 contains metal. Since metal is a material that is relatively difficult to deform, the push portion 62 is less likely to deform. Such configuration provides a structure in which the angle θL between the pedal back surface 405 and the axis OL of the connecting rod 60 is easily keepable.

[1-8] The pedal device 1 further includes the first stopper 70 connected to the pedal 40 via the rotating plate 43. The first stopper 70 stops the rotation of the pedal 40 by contacting the housing recess third side surface 303 of the housing 5 when the pedal 40 is not stepped on by the driver of the vehicle.

In such manner, when the pedal 40 is not stepped on by the driver of the vehicle, the connecting rod 60 and the pedal 40 do not rotate, thereby the shaft 41 connected to the pedal 40 via the rotating plate 43 does not rotate. Therefore, when the pedal 40 is not stepped on by the driver of the vehicle, the shaft 41 and the first housing 10 do not slide, thereby rattling between the shaft 41 and the first housing 10 is suppressible.

[1-9] The reaction force generating mechanism 30 has the mechanism-side contact surface 373. The mechanism-side contact surface 373 contacts the push portion 62 when the pedal 40 is stepped on by the driver of the vehicle. Further, the mechanism-side contact surface 373 is a flat surface.

In such manner, it is possible to reduce a pressure caused by the force transmitted from the push portion 62 to the reaction force generating mechanism 30 as compared with a case where the portion of the reaction force generating mechanism 30 contacting the push portion 62 is formed as an angle. Therefore, since stress applied to the reaction force generating mechanism 30 is reduced, the reaction force generating mechanism 30 is less likely to be damaged. Also, since the mechanism-side contact surface 373 is a flat surface, manufacturing of the reaction force generating mechanism 30 is facilitated.

[1-10] The rod fixing hole 403 is formed in the pedal back surface 405. The arm hole 611 corresponding to the rod fixing hole 403 is formed in the arm portion 61. The arm portion 61 is connected to the pedal back surface 405 by an insertion of the rod connecting screw 65 into the rod fixing hole 403 and into the arm hole 611. Note that the rod connecting screw 65 corresponds to a rod-shaped member. Also, the rod-shaped member may be a pin or a snap fit. The rod fixing hole 403 corresponds to a pedal hole.

Since the pedal back surface 405 and the arm portion 61 are thereby fixed, the angle θL between the pedal back surface 405 and the axis OL of the connecting rod 60 becomes structurally maintainable, i.e., is easily keepable.

[1-11] The rod fixing hole 403 penetrates through the pedal back surface 405 and the pedal surface 404. The pedal surface 404 is a surface of the pedal 40 opposite to the pedal back surface 405.

Thus, the pedal back surface 405 and the arm portion 61 are easily fixable to each other, since the rod connecting screw 65 is insertable into the rod fixing hole 403 and into the arm hole 611 from a pedal surface 404 side. Such configuration provides a structure in which the angle θL between the pedal back surface 405 and the axis OL of the connecting rod 60 is easily keepable.

[1-12] The pedal device 1 includes the pad 402. The pad 402 is connected to the pedal surface 404, and covers the rod fixing hole 403.

In such manner, the rod fixing hole 403 is not visible from the driver's side of the vehicle, thereby improving a design of the pedal device 1.

[1-13] The pedal device 1 is mounted on a vehicle and is an organ-type device. Specifically, the portion of the pedal 40 that is in front of the vehicle with respect to the rotation axis CL rotates toward the floor 2 in the vehicle interior in response to an increase in the stepping force applied to the pedal 40 by the driver of the vehicle.

Here, when the pedal device 1 is an organ-type pedal device 1, the housing 5 and the reaction force generating mechanism 30 accommodated in the housing 5 must be housed in the vehicle interior, which requires the pedal device 1 to be miniaturized. In the present embodiment, since the connecting rod 60 rotates together with the pedal 40 about the rotation axis CL while maintaining the angle θL between the pedal back surface 405 and the axis OL of the connecting rod 60, a link mechanism combining a plurality of links is not required. Therefore, compared with the link mechanism, the number of components is reducible, thereby miniaturization of the pedal device 1 is achievable. In addition, compared to the link mechanism, the shapes of the components are simplified, thereby the pedal device 1 is made smaller.

Second Embodiment

In the second embodiment, the shape of a push portion 62 of a connecting rod 60 is different from that in the first embodiment.

Figure 7:
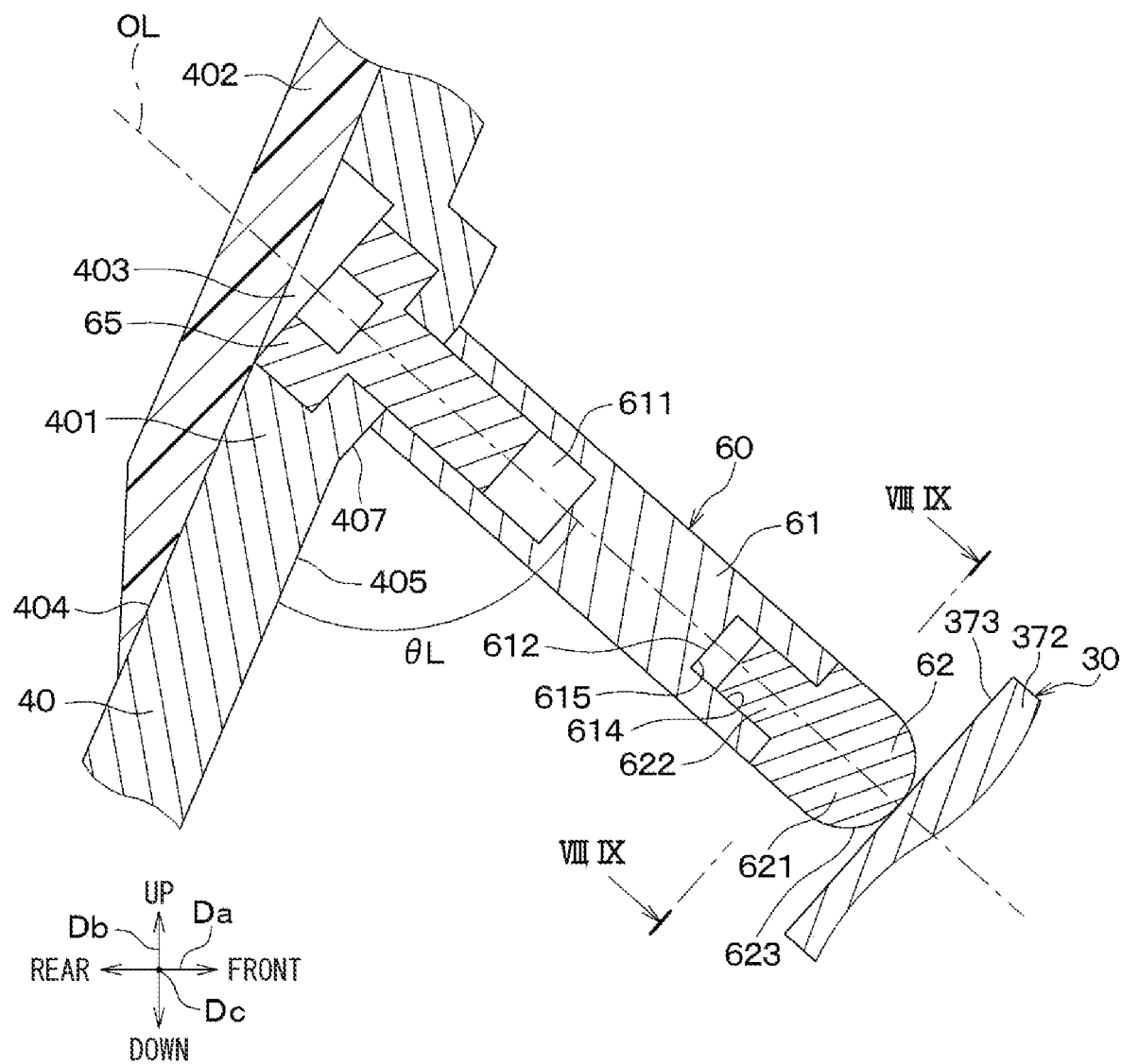
FIG. 7 is a cross-sectional view of a pedal and a connecting rod in a pedal device of a second embodiment.
Figure 8:
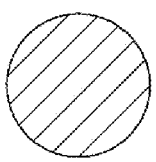
FIG. 8 is a cross-sectional view taken along a line VIII-VIII of FIG. 7.

A push contactor 621 of the push portion 62 includes a push-side contact surface 623. The push-side contact surface 623 is a surface that contacts a mechanism-side contact surface 373 of a reaction force generating mechanism 30 when a pedal 40 is stepped on by the driver of the vehicle. The push-side contact surface 623 is formed in a convex shape that is convex toward the reaction force generating mechanism 30. Specifically, as shown in FIGS. 7 and 8, the push-side contact surface 623 is formed in a spherical shape.

The second embodiment is configured in the above-described manner. The second embodiment also achieves the same effects as achieved by the first embodiment. The second embodiment further achieves the following effects.

[2-1] The push-side contact surface 623 of the push portion 62 is formed in a convex shape that is convex toward the reaction force generating mechanism 30. Thereby, the contact between the push-side contact surface 623 and the mechanism-side contact surface 373 can either be a point contact or a line contact. If the contact between the push-side contact surface 623 and the mechanism-side contact surface 373 is a point contact, the surface pressure applied to the mechanism-side contact surface 373 is always the same regardless of the contact position between the push-side contact surface 623 and the mechanism-side contact surface 373. Therefore, the contact state between the push portion 62 and the reaction force generating mechanism 30 is easily adjustable. Also, if the contact between the push-side contact surface 623 and the mechanism-side contact surface 373 is a line contact, the surface pressure applied to the push-side contact surface 623 and the mechanism-side contact surface 373 can be made smaller than the one in the point contact. Therefore, since the stress applied to a connecting rod 60 and the reaction force generating mechanism 30 is reducible, the connecting rod 60 and the reaction force generating mechanism 30 are less likely to be damaged.

[2-2] The push-side contact surface 623 of the push portion 62 is formed in a spherical shape. In such manner, the contact between the push-side contact surface 623 and the mechanism-side contact surface 373 becomes a point contact. Therefore, as described above, the contact state between the push portion 62 and the reaction force generating mechanism 30 can be easily adjusted.

Third Embodiment

Figure 9:
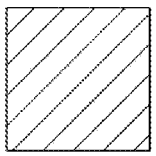
FIG. 9 is a cross-sectional view of a connecting rod of a pedal device of a third embodiment.

In the third embodiment, a push-side contact surface 623 of a push portion 62 is formed in an arc shape as shown in FIGS. 7 and 9. The third embodiment achieves effects similar to the effects achieved by the first embodiment. The third embodiment also achieves the following effects.

[3] Since the push-side contact surface 623 of the push portion 62 is formed in an arc shape, the contact between the push-side contact surface 623 and a mechanism-side contact surface 373 is a line contact. Therefore, as described above, a connecting rod 60 and a reaction force generating mechanism 30 are less likely to be damaged.

Fourth Embodiment

In the fourth embodiment, the form of a pedal 40 and the state of connection between a pedal back surface 405 and a connecting rod 60 are different from those in the first embodiment. The other configurations are similar to those of the first embodiment.

Figure 10:
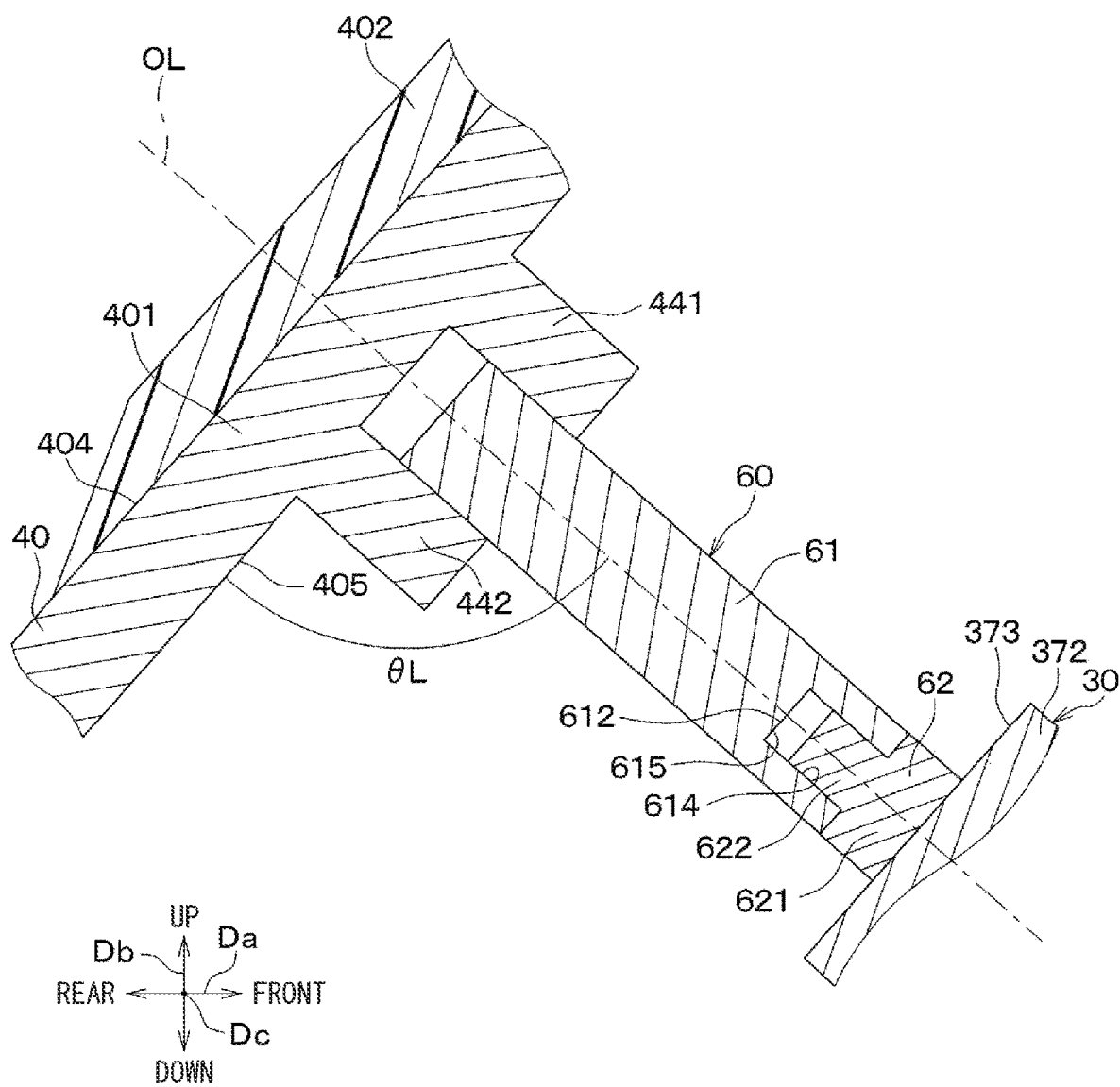
FIG. 10 is a cross-sectional view of a pedal and a connecting rod of a pedal device of a fourth embodiment.

The pedal 40 further has a first convex portion 441 and a second convex portion 442, as shown in FIG. 10. The first convex portion 441 protrudes from the pedal back surface 405 in the axial direction of the connecting rod 60. The second convex portion 442 protrudes from the pedal back surface 405 in the axial direction of the connecting rod 60. A space is formed by the first convex portion 441 and the second convex portion 442. Further, since a part of an arm portion 61 of the connecting rod 60 is inserted into this space, the arm portion 61 is connected to the pedal back surface 405 via the first convex portion 441 and the second convex portion 442. Note that, in FIG. 10, a pedal device 1 has no rod connecting screw 65 formed thereon, and the arm portion 61 has no arm hole 611 formed thereon, and the pedal 40 has no rod fixing hole 403 penetrating through a pedal surface 404 and the pedal back surface 405 formed thereon. However, an arm hole 611 and a rod fixing hole 403 may communicate with the space formed by the first convex portion 441 and the second convex portion 442, and the rod connecting screw 65 may be inserted into the rod fixing hole 403, this space and the arm hole 611. Further, the pedal back surface 405 may include a slope 407, instead of, as shown in FIG. 10, dispensing the slope 407.

The fourth embodiment is configured in the above-described manner. The fourth embodiment achieves effects similar to the effects achieved by the first embodiment. The fourth embodiment further achieves the following effects.

[4] The arm portion 61 is connected to the pedal back surface 405 via the first convex portion 441 and the second convex portion 442 by inserting a part of the arm portion 61 of the connecting rod 60 into the space defined by the two convex portions.

Accordingly, an angle θL formed between the pedal back surface 405 and an axis OL of the connecting rod 60 is changed depending on a direction along which the first convex portion 441 and the second convex portion 442 protrude. Therefore, a contact state between a push portion 62 of the connecting rod 60 and a reaction force generating mechanism 30 is changed. Therefore, by adjusting the direction in which the first convex portion 441 and the second convex portion 442 protrude, the contact state between the push portion 62 and the reaction force generating mechanism 30 is adjustable. Further, since the pedal back surface 405 and the connecting rod 60 are fixed, the angle θL between the pedal back surface 405 and the axis OL of the connecting rod 60 becomes structurally maintainable, i.e., is easily keepable.

Fifth Embodiment

In the fifth embodiment, the form of a pedal 40 and the state of connection between a pedal back surface 405 and a connecting rod 60 are different from those in the first embodiment. The other configurations are similar to those of the first embodiment.

Figure 11:
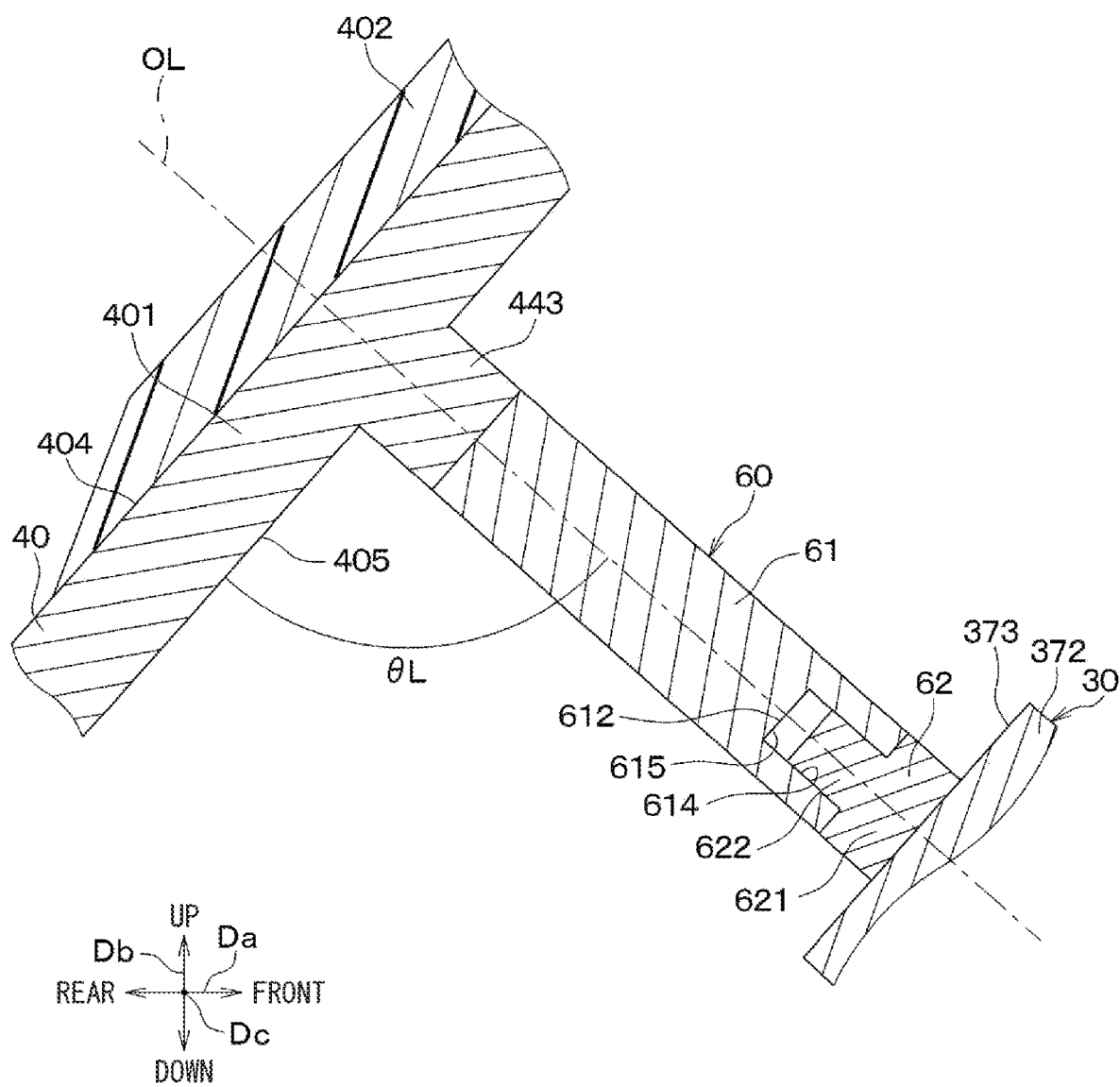
FIG. 11 is a cross-sectional view of a pedal and a connecting rod of a pedal device of a fifth embodiment.

The pedal 40 further includes a pedal convex portion 443 as shown in FIG. 11. The pedal convex portion 443 protrudes from the pedal back surface 405 in the axial direction of the connecting rod 60. Further, an end surface of the pedal convex portion 443 is connected to an end surface of an arm portion 61 of the connecting rod 60 by welding, adhesion, or the like. Thereby, the arm portion 61 is connected to the pedal back surface 405 via the pedal convex portion 443. Note that, in FIG. 11, the pedal device 1 has no rod connecting screw 65, and the arm portion 61 has no arm hole 611, and the pedal 40 has no rod fixing hole 403 penetrating through a pedal surface 404 and the pedal back surface 405. However, the arm hole 611 and the rod fixing hole 403 may communicate with a hole formed in the pedal convex portion 443, and the rod connecting screw 65 may be inserted into the rod fixing hole 403, the hole of the pedal convex portion 443 and the arm hole 611. Further, the pedal back surface 405 may include a slope 407, instead of, as shown in FIG. 11, dispensing the slope 407.

As described above, the fifth embodiment is configured. The fifth embodiment achieves effects similar to the effects achieved by the first embodiment. The fifth embodiment also achieves the following effects.

[5] The arm portion 61 is connected to the pedal back surface 405 via the pedal convex portion 443 by being connected to the pedal convex portion 443 of the pedal 40.

An angle θL formed between the pedal back surface 405 and an axis OL of the connecting rod 60 is changed depending on the direction in which the pedal convex portion 443 protrudes. Therefore, a contact state between the push portion 62 of the connecting rod 60 and a reaction force generating mechanism 30 is changed. Therefore, by adjusting the direction in which the pedal convex portion 443 protrudes, the contact state between the push portion 62 and the reaction force generating mechanism 30 is adjustable.

Sixth Embodiment

In the sixth embodiment, the form of a pedal 40 and the state of connection between a pedal back surface 405 and a connecting rod 60 are different from the first embodiment. The other configurations are similar to those of the first embodiment.

Figure 12:
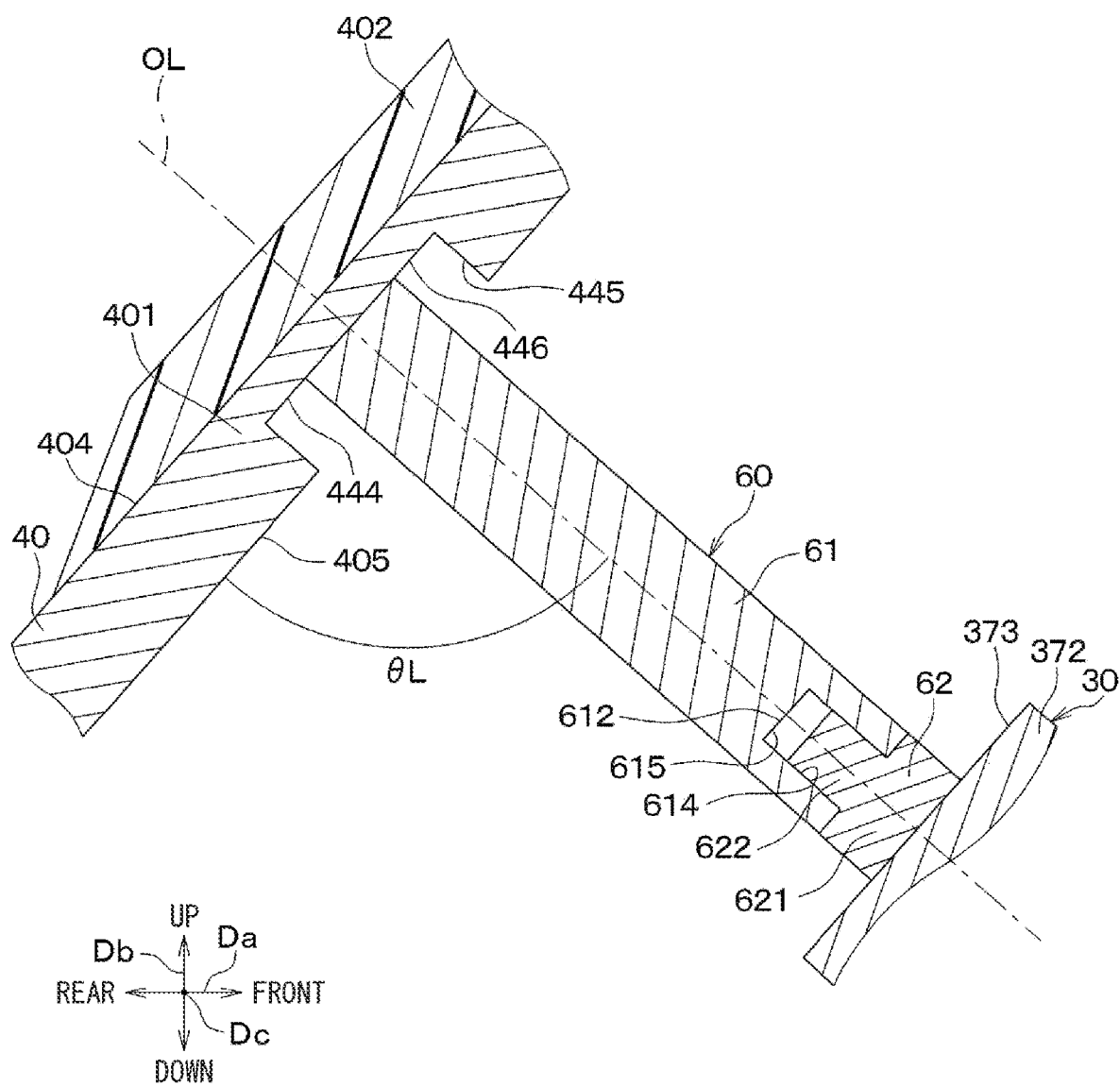
FIG. 12 is a cross-sectional view of a pedal and a connecting rod of a pedal device of a sixth embodiment.

The pedal 40 further has a pedal recess 444 as shown in FIG. 12. The pedal recess 444 is recessed from the pedal back surface 405 in the axial direction of the connecting rod 60. The pedal recess 444 also includes a pedal recess side surface 445 and a pedal recess bottom surface 446. The pedal recess side surface 445 is connected to the pedal back surface 405. The pedal recess bottom surface 446 is connected to the pedal recess side surface 445. Further, the pedal recess bottom surface 446 is connected to an end surface of an arm portion 61 by welding and adhesion. At this time, a part of the arm portion 61 may be supported by the pedal recess side surface 445 and by the pedal recess bottom surface 446 without welding or bonding between the pedal recess bottom surface 446 and the end surface of arm portion 61. Note that, in FIG. 12, a pedal device 1 has no rod connecting screw 65, and the arm portion 61 has no arm hole 611 formed therein, and the pedal 40 has no rod fixing hole 403 penetrating through a pedal surface 404 and the pedal back surface 405. However, the arm hole 611 and the rod fixing hole 403 may communicate with the space formed by the pedal recess side surface 445 and the pedal recess bottom surface 446, and the rod connecting screw 65 may be inserted into the rod fixing hole 403, the above space, and the arm hole 611. Further, the pedal back surface 405 may include a slope 407, instead of, as shown in FIG. 12, dispensing the slope 407.

The sixth embodiment is configured in the above-described manner. The sixth embodiment exerts the same effects as the first embodiment. The sixth embodiment further achieves the following effects.

[6] The arm portion 61 has a portion that is connected to the pedal back surface 405 via the pedal recess 444, by an insertion of a part of the arm portion 61 into a space formed by the pedal recess side surface 445 and the pedal recess bottom surface 446.

An angle θL formed between the pedal back surface 405 and an axis OL of the connecting rod 60 is changeable depending on the direction in which the pedal recess 444 is recessed. Therefore, a contact state between a push portion 62 of the connecting rod 60 and the reaction force generating mechanism 30 is changeable. Thus, by adjusting the direction in which the pedal recess 444 is recessed, the contact state between the push portion 62 and the reaction force generating mechanism 30 is adjustable.

Seventh Embodiment

In the seventh embodiment, the form of an arm portion 61 and a push portion 62 of a connecting rod 60 is different from the first embodiment. The other configurations are the same as or similar to those of the first embodiment.

Figure 13:
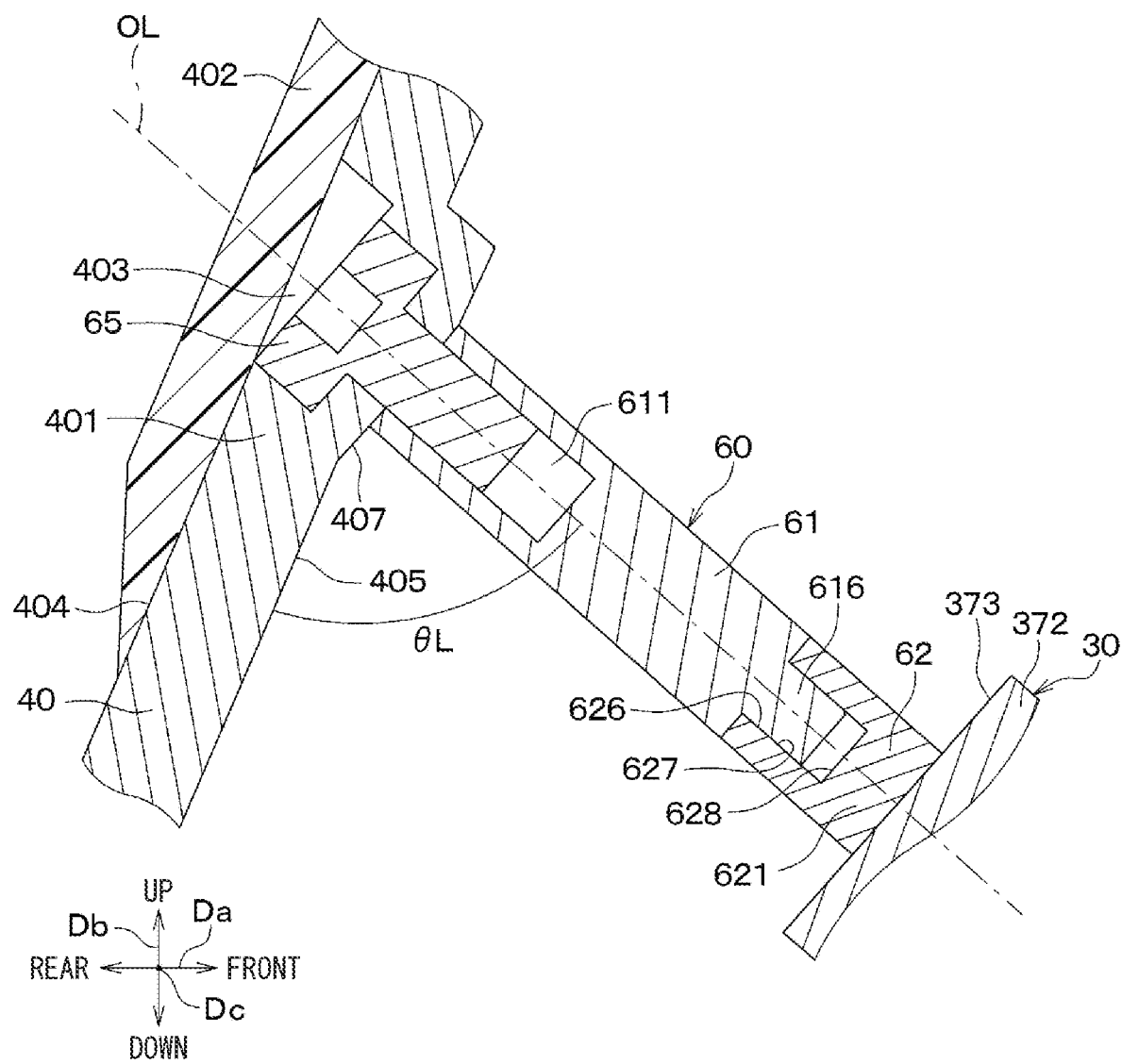
FIG. 13 is a cross-sectional view of a pedal and a connecting rod of a pedal device of a seventh embodiment.

As shown in FIG. 13, the push portion 62 does not have a push convex portion 622, but has a push recess 626. The push recess 626 is recessed in the axial direction of the connecting rod 60 from an end surface of the push portion 62 on an arm portion 61 side. The push recess 626 also includes a push recess side surfaces 627 and a push recess bottom surface 628. The push recess side surface 627 is connected to an end surface of the push portion 62 on an arm portion 61 side. The push recess bottom surface 628 is connected to the push recess side surface 627.

The arm portion 61 has no arm recess 612, but has an arm convex portion 616. The arm convex portion 616 protrudes in the axial direction of the connecting rod 60 from an end surface of the arm portion 61 on a push portion 62 side. Also, the arm convex portion 616 is inserted into a space formed by the push recess side surface 627 and the push recess bottom surface 628. Thereby, the arm portion 61 and the push portion 62 are connected.

The seventh embodiment is configured in the above-described manner. The seventh embodiment achieves the same effects as the first embodiment except for the above-described item [1-5]. In addition, the seventh embodiment further achieves the following effects.

[7] The push portion 62 includes the push recess 626. The push recess 626 is recessed in the axial direction of the connecting rod 60 from the end surface of the push portion 62 on an arm portion 61 side. Further, the push recess 626 includes the push recess bottom surface 628 and the push recess side surfaces 627 connected to the push recess bottom surface 628. The arm portion 61 has the arm convex portion 616. The arm convex portion 616 protrudes in the axial direction of the connecting rod 60 from the end surface of the arm portion 61 on a push portion 62 side. The push portion 62 and the arm portion 61 are connected by an insertion of the arm convex portion 616 into the space formed by the push recess bottom surface 628 and the push recess side surface 627.

Since the push portion 62 and the arm portion 61 are thereby fixed, the push portion 62 and the arm portion 61 are less likely to come off.

Eighth Embodiment

The form of a pad 402 is different in the eighth embodiment. The other configurations are the same as or similar to those of the first embodiment.

Figure 14:
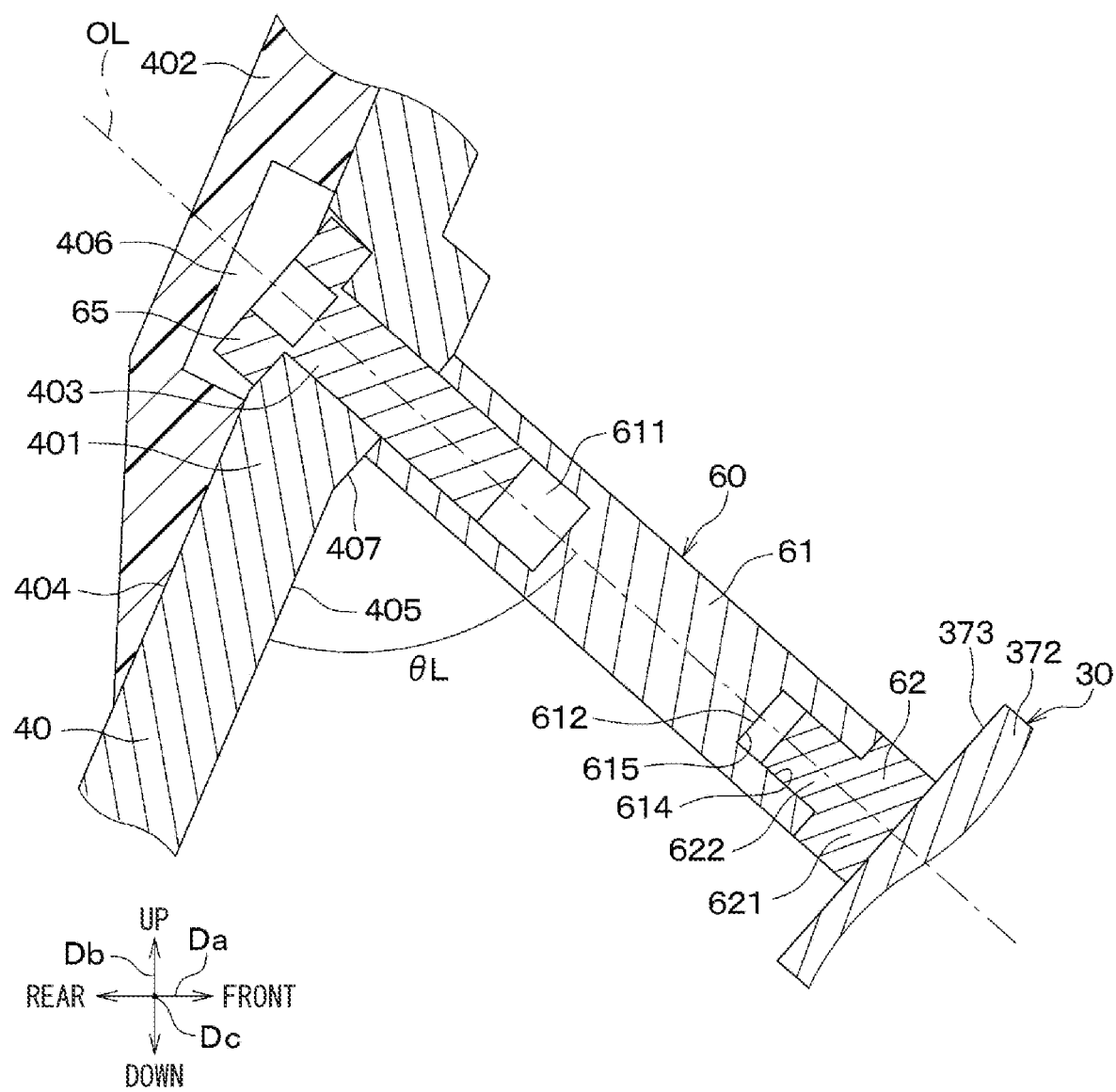
FIG. 14 is a cross-sectional view of a pedal and connecting rod of a pedal device of an eighth embodiment.

The pad 402 includes a pad space 406 that communicates with a rod fixing hole 403, as shown in FIG. 14. Also, a rod connecting screw 65 is inserted into the pad space 406, the rod fixing hole 403 and an arm hole 611. Thereby, a pedal back surface 405 and a connecting rod 60 are connected.

The eighth embodiment is configured in the above-described manner. Thus, the eighth embodiment also achieves the same effects as the first embodiment.

Ninth Embodiment

In the ninth embodiment, a pedal device 1 has no rod connecting screw 65, and an arm portion 61 of a connecting rod 60 has no arm hole 611. Also, the connection between a pedal back surface 405 and the connecting rod 60 is different from that of the first embodiment. The other configurations are similar to those of the first embodiment.

Figure 15:
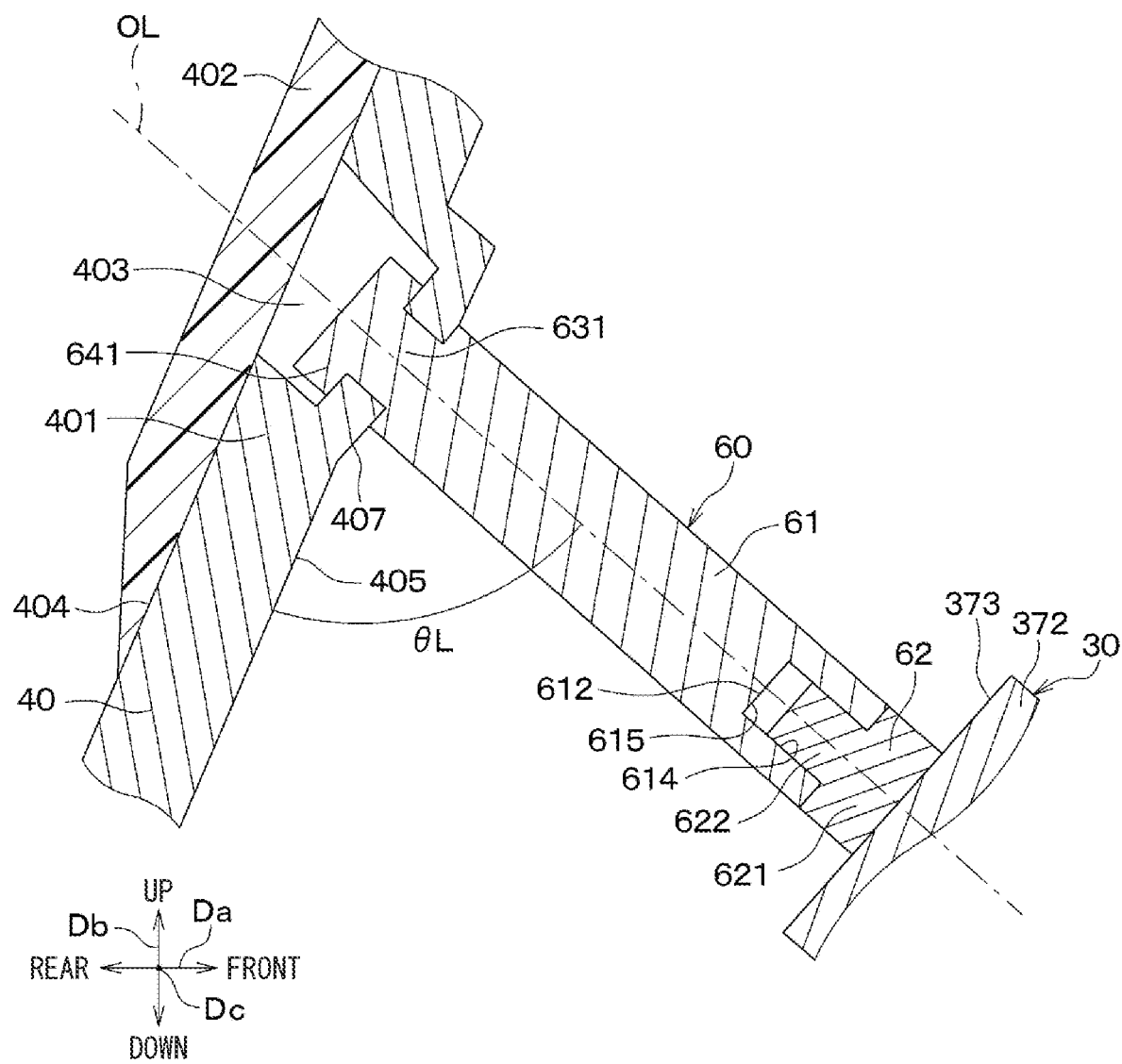
FIG. 15 is a cross-sectional view of a pedal and a connecting rod of a pedal device of a ninth embodiment.

The arm portion 61 has an insertion portion 631 and a support portion 641, as shown in FIG. 15. The insertion portion 631 is inserted into a rod fixing hole 403. The support portion 641 is connected to one side of the insertion portion 631 opposite to a push portion 62, and is inserted into the rod fixing hole 403. In addition, the length of the support portion 641 is longer than the length of the insertion portion 631 in the direction orthogonal to the axial direction of the connecting rod 60. Therefore, the support portion 641 is in contact with a surface of a pedal 40 forming the rod fixing hole 403. Thus, the arm portion 61 is caulked to the pedal back surface 405 and is connected to the pedal back surface 405.

The ninth embodiment is configured in the above-described manner. The ninth embodiment also has the same effects as the first embodiment, except for the above-described item [1-10]. In addition, the ninth embodiment further achieves the following effects.

[8] The rod fixing hole 403 is formed in the pedal 40. The rod fixing hole 403 penetrates through the pedal back surface 405 and the pedal surface 404. The arm portion 61 has the insertion portion 631 and the support portion 641. The insertion portion 631 is inserted into the rod fixing hole 403. The support portion 641 is connected to one side of the insertion portion 631 opposite to the push portion 62.

Further, the support portion 641 is in contact with the pedal 40 in such a configuration in which the length of the support portion 641 is made longer than the length of the insertion portion 631 in the direction orthogonal to the axial direction of the connecting rod 60. Further, the arm portion 61 is connected to the pedal back surface 405 by an insertion of the insertion portion 631 into the rod fixing hole 403.

Since the pedal back surface 405 and the arm portion 61 are fixed by the support portion 641, an angle θL between the pedal back surface 405 and an axis OL of the connecting rod 60 is structurally maintainable, i.e., is easily keepable.

Tenth Embodiment

In the tenth embodiment, the arrangement of a support portion 641 of an arm portion 61 is different from that in the ninth embodiment. Other than the above, the tenth embodiment is the same as the ninth embodiment.

Figure 16:
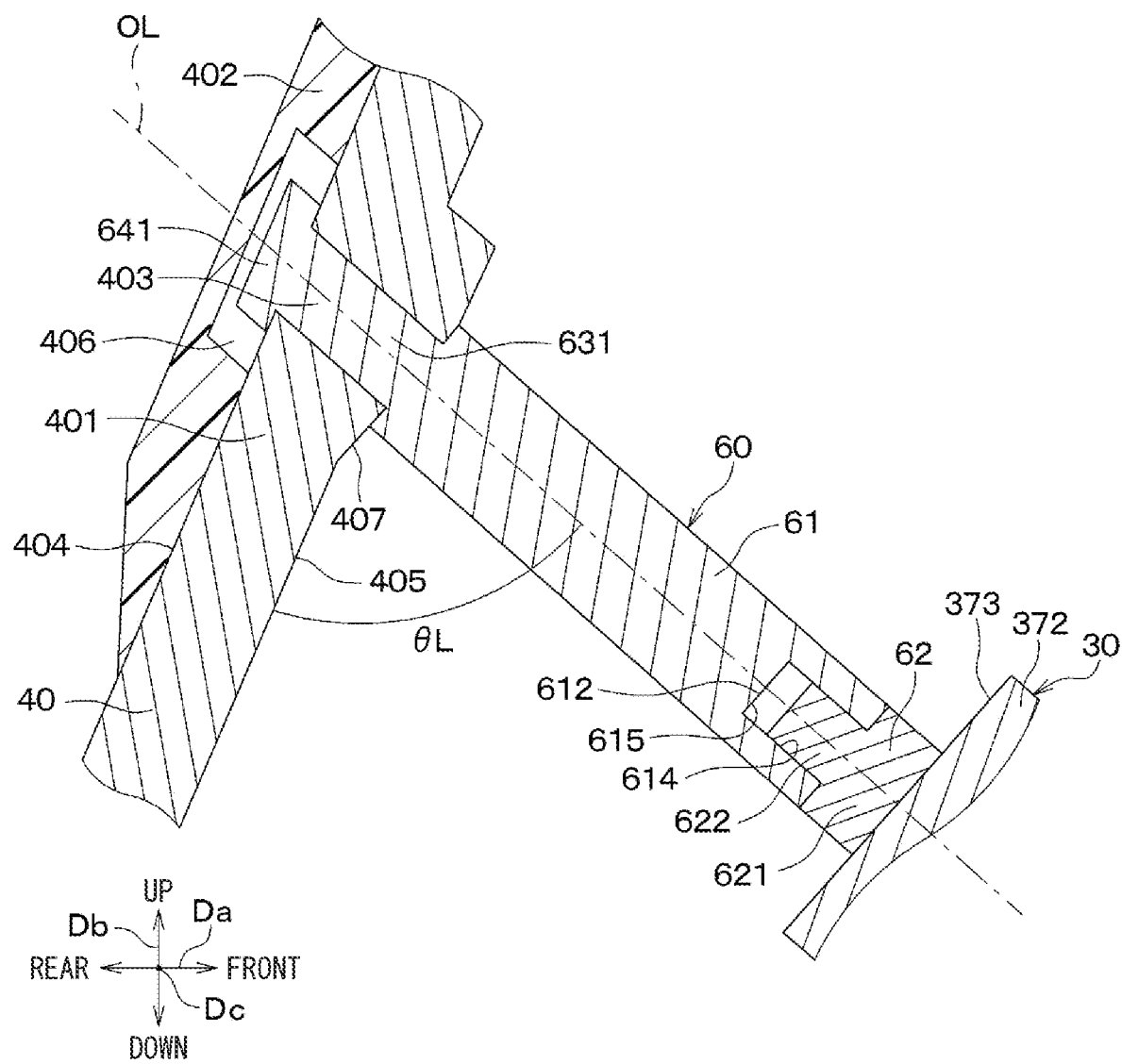
FIG. 16 is a cross-sectional view of a pedal and a connecting rod of a pedal device of a tenth embodiment.

The support portion 641 is arranged in a pad space 406 of a pad 402, as shown in FIG. 16. Therefore, the support portion 641 is in contact with a pedal surface 404 of a pedal 40.

The tenth embodiment is configured in the above-described manner. Thus, the tenth embodiment also achieves the same effects as in the ninth embodiment.

Eleventh Embodiment

Figure 17:
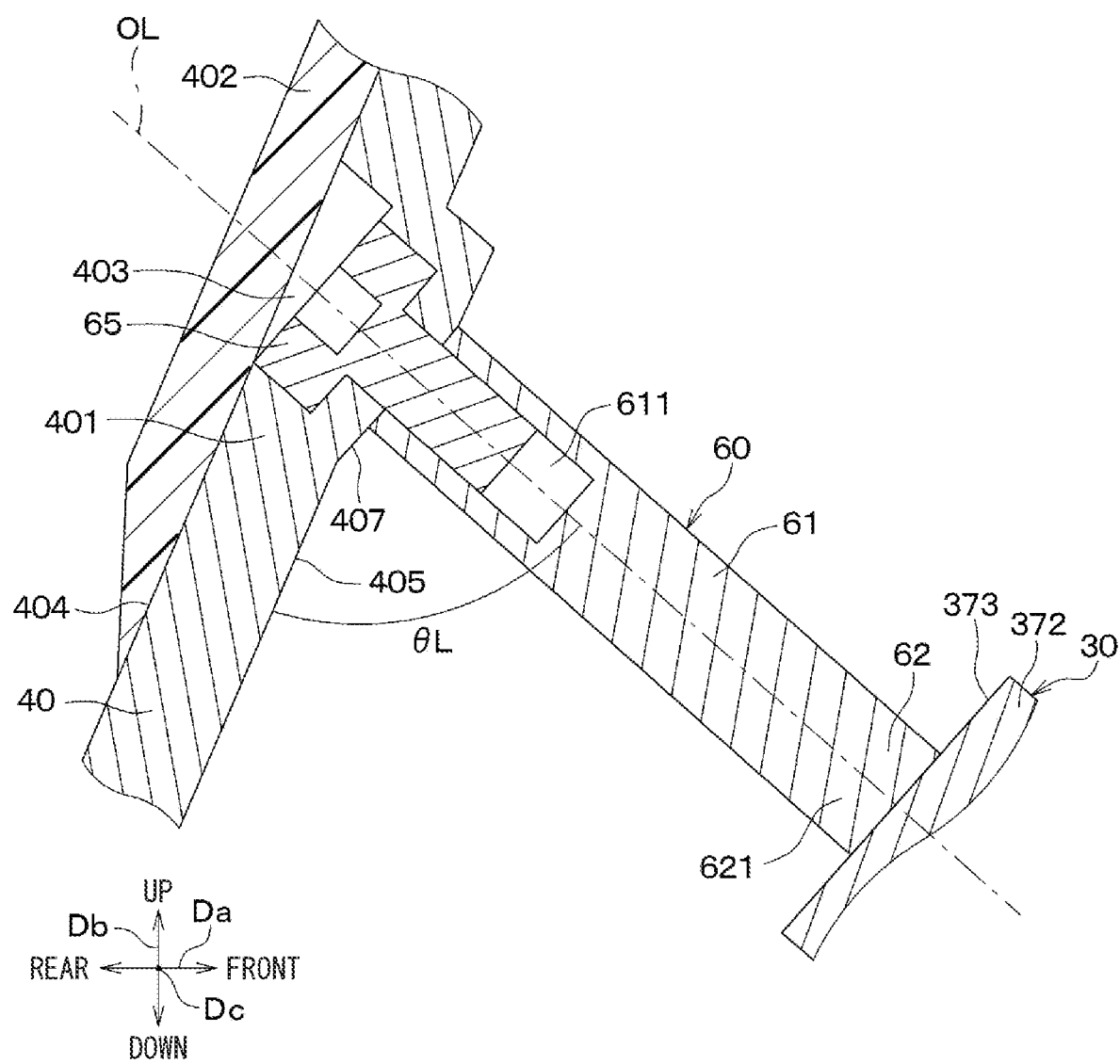
FIG. 17 is a cross-sectional view of a pedal and a connecting rod of a pedal device of an eleventh embodiment.

In the eleventh embodiment, as shown in FIG. 17, an arm portion 61 and a push portion 62 of a connecting rod 60 are integrally formed. The other configurations are the same as or similar to those of the first embodiment. The eleventh embodiment also achieves the same effects as the first embodiment, except for the item [1-3] described above. The eleventh embodiment further achieves the following effects.

[9] Since the arm portion 61 and the push portion 62 are integrally formed, the number of parts can be reduced as compared to the case where the arm portion 61 and the push portion 62 are formed separately.

Twelfth Embodiment

The twelfth embodiment is different from the second or third embodiment in the form of a mechanism-side contact surface 373 of a reaction force generating mechanism 30.

Figure 18:
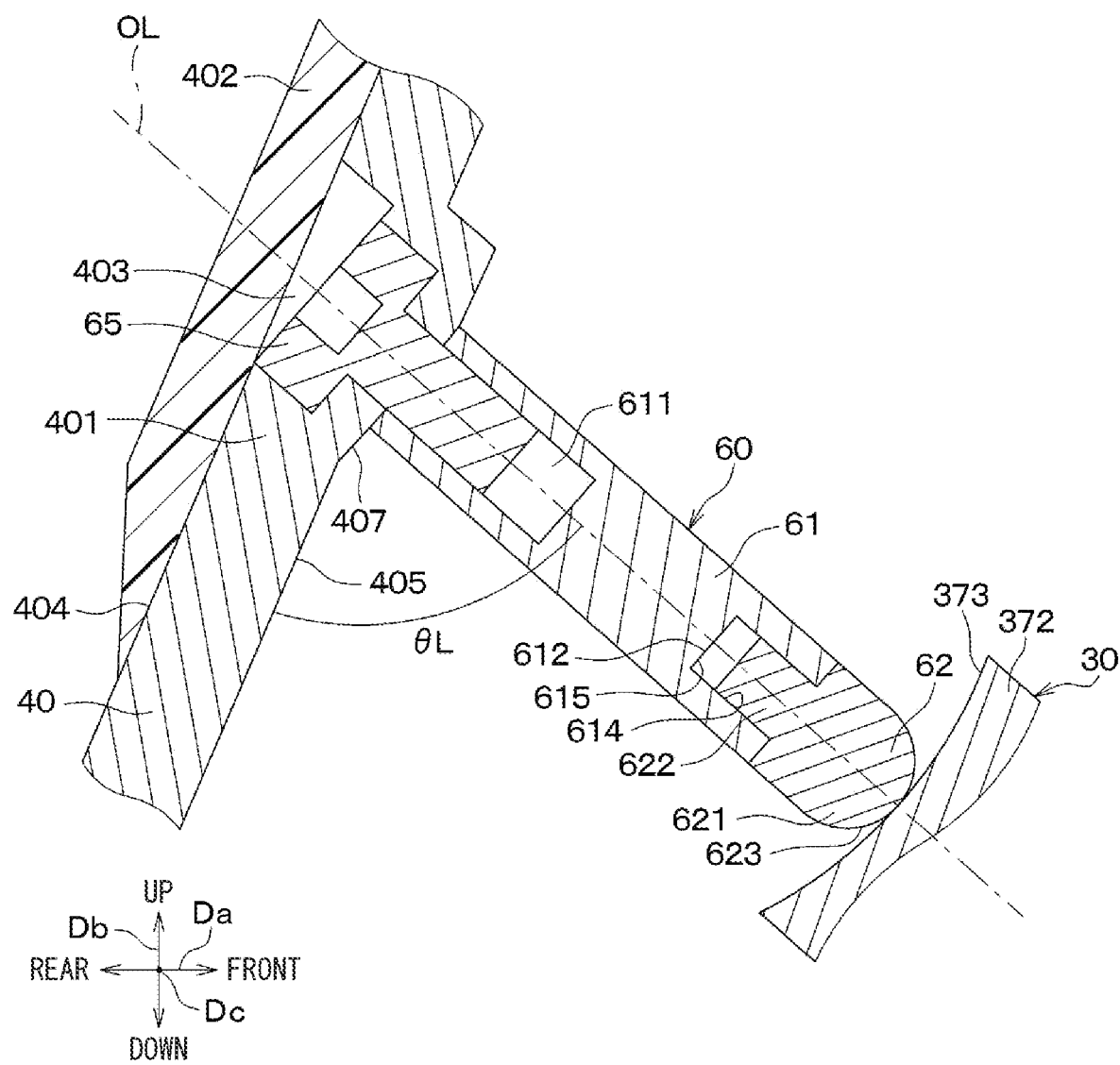
FIG. 18 is a cross-sectional view of a pedal and a connecting rod of a pedal device of a twelfth embodiment.

As shown in FIG. 18, the mechanism-side contact surface 373 is formed in a recess shape that is recessed toward an inside of the reaction force generating mechanism 30. Specifically, the mechanism-side contact surface 373 is formed in a spherical shape and an arc shape.

The twelfth embodiment is configured in the above-described manner. The twelfth embodiment also achieves the same effect as the second or third embodiment. Further, the twelfth embodiment achieves the following effects.

[10] A push-side contact surface 623 of a push portion 62 is formed in a convex shape, and the mechanism-side contact surface 373 is formed in a recess shape recessed toward an inside of the reaction force generating mechanism 30. Thereby, the size of the contact area between the push-side contact surface 623 and the mechanism-side contact surface 373 is increasable. Therefore, the surface pressure applied to the push-side contact surface 623 and the mechanism-side contact surface 373 is reducible. Thus, since the stress applied to a connecting rod 60 and the reaction force generating mechanism 30 is reducible, the connecting rod 60 and the reaction force generating mechanism 30 are less likely to be damaged.

Thirteenth Embodiment

In the thirteenth embodiment, a pedal device 1 has no rod connecting screw 65 and an arm portion 61 of a connecting rod 60 has no arm hole 611. Also, the connection between a pedal back surface 405 and the connecting rod 60 is different from that of the first embodiment. The other configurations are similar to those of the first embodiment.

Figure 19:
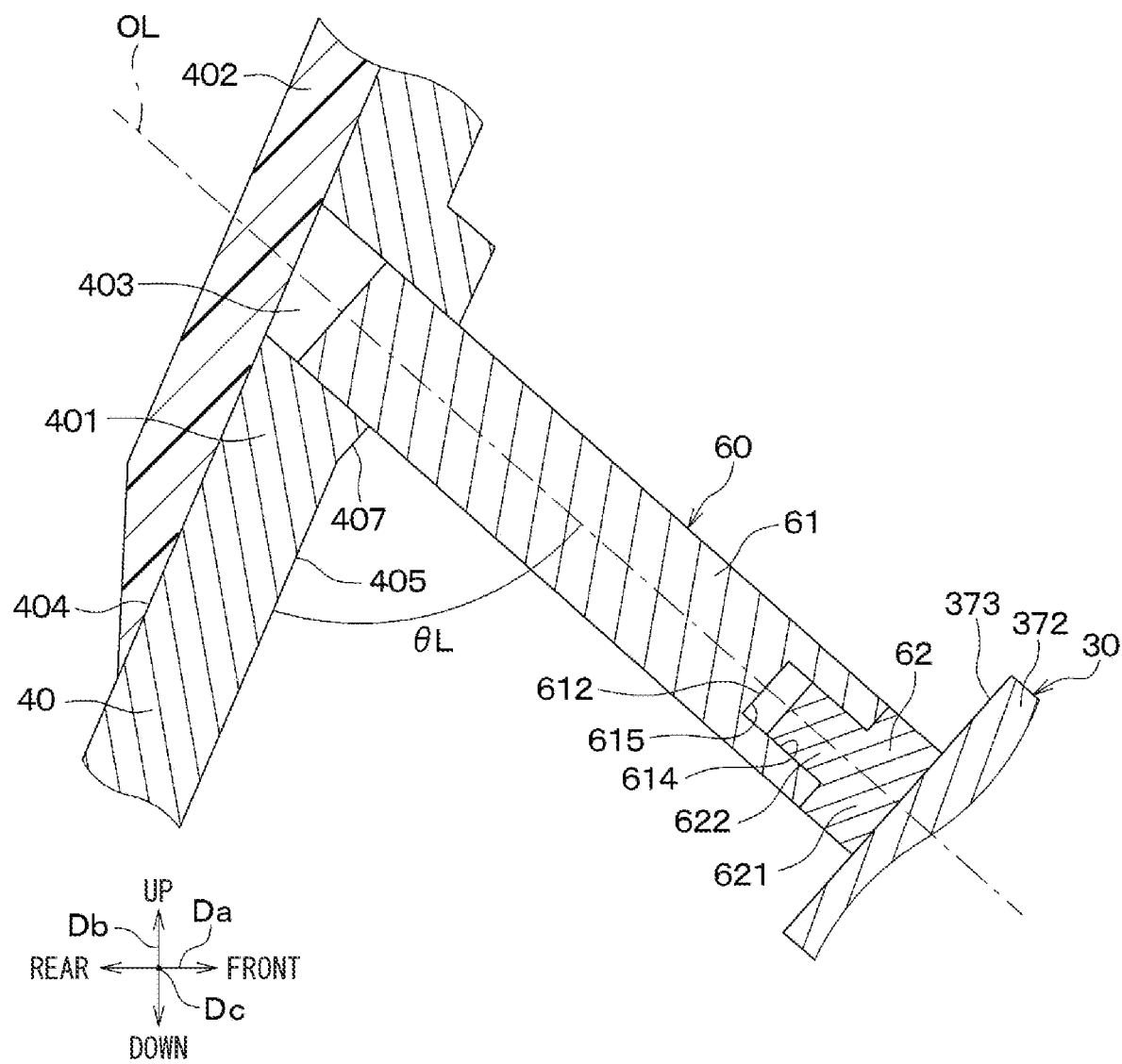
FIG. 19 is a cross-sectional view of a pedal and a connecting rod of a pedal device of a thirteenth embodiment.

A part of the arm portion 61 is press-fitted into a rod fixing hole 403. In such manner, a part of the arm portion 61 is inserted into the rod fixing hole 403 as shown in FIG. 19. Therefore, the arm portion 61 and a pedal 40 are connected.

The thirteenth embodiment is configured in the above-described manner. The thirteenth embodiment also achieves the same effects as the first embodiment, except for the item [1-10] described above. The thirteenth embodiment further achieves the following effects.

[11] The rod fixing hole 403 is formed in the pedal 40. The rod fixing hole 403 penetrates through the pedal back surface 405 and a pedal surface 404. The arm portion 61 is connected to the pedal back surface 405 by an insertion of a part of the arm portion 61 into the rod fixing hole 403. Although the rod fixing hole 403 penetrates through the pedal back surface 405 and the pedal surface 404, such a configuration of penetrating through pedal back surface 405 and pedal surface 404 is not limiting. The rod fixing hole 403 may be a hole recessed from the pedal back surface 405.

Since the pedal back surface 405 and the arm portion 61 are thereby fixed, an angle θL between the pedal back surface 405 and an axis OL of the connecting rod 60 becomes structurally maintainable, i.e., is easily keepable.

Fourteenth Embodiment

Figure 20:
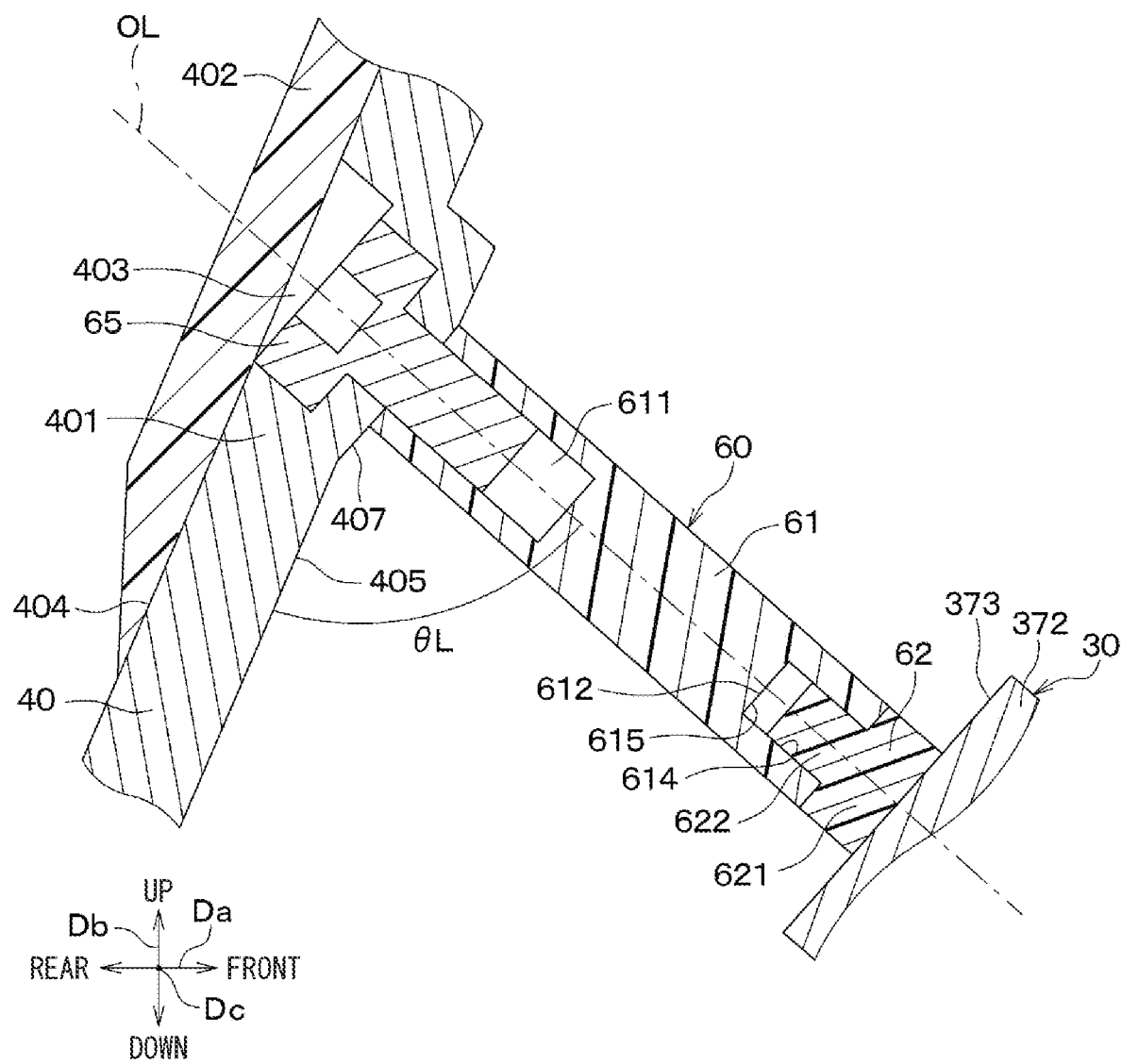
FIG. 20 is a cross-sectional view of a pedal and a connecting rod of a pedal device of a fourteenth embodiment.

In the fourteenth embodiment, as shown in FIG. 20, an arm portion 61 and a push portion 62 of a connecting rod 60 are made of resin such as PTFE or the like instead of metal. The arm portion 61 and the push portion 62 of the connecting rod 60 may be made of a composite material made of metal and resin. PTFE is an abbreviation of Poly Tetra Fluoro Ethylene.

The fourteenth embodiment is configured in the above-described manner. The fourteenth embodiment also achieves the same effects as the first embodiment. Further, the fourteenth embodiment achieves the following effects.

[12-1] The arm portion 61 includes resin. Since resin has a relatively low specific gravity, the connecting rod 60 can be made lightweight. Therefore, the weight of a pedal device 1 can be reduced.

[12-2] The push portion 62 includes resin. Since resin has a relatively low specific gravity, the connecting rod 60 can be made lightweight. In such manner, the weight of the pedal device 1 is reducible. Further, the push portion 62 includes PTFE. Therefore, the coefficient of friction between the push portion 62 and a mechanism-side contact surface 373 of a reaction force generating mechanism 30 is lower than when the push portion 62 includes metal. Therefore, the slidability between the push portion 62 and the mechanism-side contact surface 373 is improvable.

Other Embodiments

The present disclosure is not limited to the above-described embodiments, and the above-described embodiments can be appropriately modified. Further, individual elements or features of a particular embodiment are not necessarily essential unless it is specifically stated that the elements or the features are essential in the foregoing description, or unless the elements or the features are obviously essential in principle.

In the above embodiment, the pedal device 1 is used as a brake pedal in the brake-by-wire system 150 that controls the brakes of a vehicle. On the other hand, the pedal device 1 is not limited to being used as a brake pedal. A pedal device 1 may also be used, for example, as an accelerator pedal for accelerating a vehicle.

In the above embodiment, the pedal device 1 is an organ-type pedal device 1. On the other hand, the pedal device 1 is not limited to being an organ-type pedal device 1. For example, a pedal device 1 may also be a suspended pedal device 1. In the suspension-type pedal device 1, a portion of a pedal 40 in the rear the vehicle relative to a rotation axis CL rotates toward a floor 2 or a dash panel in the vehicle compartment in response to an increase in the stepping force of the driver applied to the pedal 40.

In the above embodiment, the reaction force generating mechanism 30 uses the plate spring 31, the large-diameter coil spring 33, and the small-diameter coil spring 34 respectively as an elastic member. On the other hand, the number of elastic members of a reaction force generating mechanism 30 is not limited to three. The number of elastic members of the reaction force generating mechanism 30 may be one or more.

In the above-described embodiment, in the brake-by-wire system 150, hydraulic pressure is generated in the brake fluid flowing through the brake circuit 120 by the master cylinder 126. On the other hand, the hydraulic pressure is not limited to be generated in the brake fluid flowing through the brake circuit 120 by the master cylinder 126. For example, hydraulic pressure may be generated in the brake fluid flowing through a brake circuit 120 by a hydraulic pump.

In the above embodiment, the arm portion 61 of the connecting rod 60 is connected to the pedal back surface 405. Alternatively, an arm portion 61 may be connected to a pedal back surface 405 via an intermediate member such as a shim or the like.

In the above-described second and third embodiments, the push-side contact surface 623 of the push portion 62 is formed in a spherical shape or an arc shape, thereby forming a convex surface. However, the push-side contact surface 623 is not limited to being formed in a spherical shape or an arc shape, and may also be formed in a convex shape by being formed in an elliptical arc shape or the like.

In the above-described twelfth embodiment, the mechanism-side contact surface 373 of the reaction force generating mechanism 30 is formed in a spherical shape or an arc shape, thereby forming a recess shape. However, the mechanism-side contact surface 373 is not limited to being formed in a spherical shape or an arc shape, and may also be formed in a recess shape by being formed in an elliptical arc shape or the like.

In the above embodiment, the first housing 10 of the housing 5 is box-shaped. On the other hand, the first housing 10 is not limited to being box-shaped, and may also be plate-shaped, for example.

The embodiments described above may be appropriately combined with each other.

What is claimed is:
1. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and
a connecting rod including: an arm portion connected to a back surface of the pedal, which is a surface of the pedal opposite to a stepping surface stepped on by the operator; and a push portion connected to the arm portion, wherein
the push portion is configured to transmit force from the pedal to the reaction force generating mechanism by contacting the reaction force generating mechanism when the pedal is stepped on by the operator,
the connecting rod is connected to the back surface of the pedal, to rotate with the pedal about the axis of the shaft when the operator steps on the pedal, while an angle defined between the back surface of the pedal and an axis of the connecting rod is maintained,
the push portion has a push-side contact surface that contacts the reaction force generating mechanism when the pedal is stepped on by the operator,
the push-side contact surface is convex toward the reaction force generating mechanism,
the reaction force generating mechanism has a mechanism-side contact surface that contacts the push portion when the operator steps on the pedal, and
the mechanism-side contact surface is recessed toward an inside of the reaction force generating mechanism.

2. The pedal device according to claim 1, wherein the push portion is in contact with the reaction force generating mechanism when the pedal is not stepped on by the operator.

3. The pedal device according to claim 1, wherein the back surface of the pedal includes a slope that is inclined with respect to a direction in which the back surface of the pedal extends, and the arm portion is connected to the slope.

4. The pedal device according to claim 1, wherein the push-side contact surface is formed in a spherical shape.

5. The pedal device according to claim 1, wherein the push-side contact surface is formed in an arc shape.

6. The pedal device according to claim 1, wherein the pedal includes a first convex portion and a second convex portion respectively protruding from the back surface of the pedal, and the arm portion is connected to the back surface of the pedal by inserting a part of the arm portion into a space between the first convex portion and the second convex portion.

7. The pedal device according to claim 1, wherein the arm portion and the push portion are made of separated bodies.

8. The pedal device according to claim 7, wherein a side surface of the arm portion is parallel to a side surface of the push portion.

9. The pedal device according to claim 1, wherein the arm portion and the push portion are integrally formed.

10. The pedal device according to claim 1, wherein at least one of the arm portion or push portion includes a metal or a resin.

11. The pedal device according to claim 1, further comprising:
a stopper connected to the pedal, wherein
the stopper is configured to stop rotation of the pedal by coming into contact with the support when the pedal is not stepped on by the operator.

12. The pedal device according to claim 1 being configured to be mounted on a vehicle, wherein
a portion of the pedal positioned in front of the vehicle relative to the axis of the shaft is configured to rotate toward a floor in a vehicle compartment in response to an increase in the stepping force of the operator applied to the pedal.

13. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and
a connecting rod including: an arm portion connected to a back surface of the pedal, which is a surface of the pedal opposite to a stepping surface stepped on by the operator; and a push portion connected to the arm portion, wherein
the push portion is configured to transmit force from the pedal to the reaction force generating mechanism by contacting the reaction force generating mechanism when the pedal is stepped on by the operator,
the connecting rod is connected to the back surface of the pedal, to rotate with the pedal about the axis of the shaft when the operator steps on the pedal, while an angle defined between the back surface of the pedal and an axis of the connecting rod is maintained,
the pedal further includes a pedal convex portion protruding from the back surface of the pedal, and
the arm portion is connected to the back surface of the pedal via the pedal convex portion connected to the arm portion.

14. The pedal device according to claim 13, wherein
the reaction force generating mechanism has a mechanism-side contact surface that contacts the push portion when the operator steps on the pedal, and
the mechanism-side contact surface is a flat surface.

15. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and
a connecting rod including: an arm portion connected to a back surface of the pedal, which is a surface of the pedal opposite to a stepping surface stepped on by the operator; and a push portion connected to the arm portion, wherein
the push portion is configured to transmit force from the pedal to the reaction force generating mechanism by contacting the reaction force generating mechanism when the pedal is stepped on by the operator,
the connecting rod is connected to the back surface of the pedal, to rotate with the pedal about the axis of the shaft when the operator steps on the pedal, while an angle defined between the back surface of the pedal and an axis of the connecting rod is maintained,
the pedal is provided with a pedal hole opened from the back surface, and
the arm portion is provided with an arm hole corresponding to the pedal hole,
the pedal device further comprising
a member inserted into the pedal hole and the arm hole, and
the arm portion is connected to the back surface of the pedal by an insertion of the member into the pedal hole and the arm hole.

16. The pedal device according to claim 15, wherein
the pedal hole penetrates through a front surface and the back surface of the pedal, the front surface being opposite to the back surface of the pedal.

17. The pedal device according to claim 16, further comprising a pad connected to the front surface of the pedal to cover the pedal hole.

18. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and
a connecting rod including: an arm portion connected to a back surface of the pedal, which is a surface of the pedal opposite to a stepping surface stepped on by the operator; and a push portion connected to the arm portion, wherein
the push portion is configured to transmit force from the pedal to the reaction force generating mechanism by contacting the reaction force generating mechanism when the pedal is stepped on by the operator,
the connecting rod is connected to the back surface of the pedal, to rotate with the pedal about the axis of the shaft when the operator steps on the pedal, while an angle defined between the back surface of the pedal and an axis of the connecting rod is maintained,
the pedal includes a pedal recess recessed from the back surface of the pedal,
the pedal recess includes a pedal recess side surface, and
the arm portion is press-fitted into a space defined by the pedal recess side surface, and is connected to the back surface of the pedal via the pedal recess.

19. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and a connecting rod including: an arm portion connected to a back surface of the pedal, which is a surface of the pedal opposite to a stepping surface stepped on by the operator; and a push portion connected to the arm portion, wherein the push portion is configured to transmit force from the pedal to the reaction force generating mechanism by contacting the reaction force generating mechanism when the pedal is stepped on by the operator, the connecting rod is connected to the back surface of the pedal, to rotate with the pedal about the axis of the shaft when the operator steps on the pedal, while an angle defined between the back surface of the pedal and an axis of the connecting rod is maintained;

the arm portion and the push portion are made of separated bodies, the arm portion includes an arm recess that is recessed in an axial direction of the connecting rod from an end surface of the arm portion on a push portion side, the arm recess includes an arm recess bottom surface and an arm recess side surface connected to the arm recess bottom surface, the push portion includes a push convex portion protruding in an axial direction of the connecting rod from an end surface of the push portion on an arm portion side, and the push portion is connected to the arm portion by an insertion of the push convex portion into a space defined by the arm recess bottom surface and the arm recess side surface.

20. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and
a connecting rod including: an arm portion connected to a back surface of the pedal, which is a surface of the pedal opposite to a stepping surface stepped on by the operator; and a push portion connected to the arm portion, wherein the push portion is configured to transmit force from the pedal to the reaction force generating mechanism by contacting the reaction force generating mechanism when the pedal is stepped on by the operator, the connecting rod is connected to the back surface of the pedal, to rotate with the pedal about the axis of the shaft when the operator steps on the pedal, while an angle defined between the back surface of the pedal and an axis of the connecting rod is maintained, the arm portion and the push portion are made of separated bodies, the push portion includes a push recess recessed in an axial direction of the connecting rod from an end surface of the push portion on an arm portion side, the push recess includes a push recess bottom surface and a push recess side surface connected to the push recess bottom surface, the arm portion includes an arm convex portion protruding in an axial direction of the connecting rod from an end surface of the arm portion on a push portion side, and the arm portion is connected to the push portion by an insertion of the arm convex portion into a space defined by the push recess bottom surface and the push recess side surface.

21. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and
a connecting rod including: an arm portion connected to a back surface of the pedal, which is a surface of the pedal opposite to a stepping surface stepped on by the operator; and a push portion connected to the arm portion, wherein the push portion is configured to transmit force from the pedal to the reaction force generating mechanism by contacting the reaction force generating mechanism when the pedal is stepped on by the operator, the connecting rod is connected to the back surface of the pedal, to rotate with the pedal about the axis of the shaft when the operator steps on the pedal, while an angle defined between the back surface of the pedal and an axis of the connecting rod is maintained, the pedal is provided with a pedal hole penetrating through the back surface of the pedal and a front surface that is a surface of the pedal opposite to the back surface of the pedal, the arm portion includes an insertion portion inserted into the pedal hole, and a support portion connected to one side of the insertion portion opposite to a side of the push portion, a length of the support portion is made larger than a length of the insertion portion in a direction perpendicular to an axial direction of the connecting rod, and the support portion is in contact with the pedal, and the arm portion is connected to the back surface of the pedal by an insertion of the insertion portion into the pedal hole.

22. A pedal device comprising:
a shaft;
a pedal configured to rotate together with the shaft about an axis of the shaft when being stepped on by an operator;
a support configured to rotatably support the shaft;
a reaction force generating mechanism configured to generate a reaction force with respect to a stepping force of the operator, by an elastic deformation against to the stepping force of the operator applied to the pedal when the pedal receives force from the operator; and
a connecting rod including: an arm portion connected to a back surface of the pedal, which is a surface of the pedal opposite to a stepping surface stepped on by the operator; and a push portion connected to the arm portion, wherein the push portion is configured to transmit force from the pedal to the reaction force generating mechanism by contacting the reaction force generating mechanism when the pedal is stepped on by the operator, the connecting rod is connected to the back surface of the pedal, to rotate with the pedal about the axis of the shaft when the operator steps on the pedal, while an angle defined between the back surface of the pedal and an axis of the connecting rod is maintained, the pedal is provided with a pedal hole penetrating through the back surface of the pedal and a front surface that is a surface of the pedal opposite to the back surface of the pedal, and a part of the arm portion is inserted into the pedal hole, and the arm portion is connected to the back surface of the pedal.

\* \* \* \* \*